(12) United States Patent
Abedini et al.

(10) Patent No.: US 11,553,414 B1
(45) Date of Patent: Jan. 10, 2023

(54) MODIFIED SYNCHRONIZATION SIGNAL BLOCK FOR NETWORK ENERGY SAVING

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/355,510

(22) Filed: Jun. 23, 2021

(51) Int. Cl.
*H04W 52/02* (2009.01)
*H04W 56/00* (2009.01)

(52) U.S. Cl.
CPC ..... *H04W 52/0206* (2013.01); *H04W 56/001* (2013.01)

(58) Field of Classification Search
CPC ........................ H04W 52/0206; H04W 56/001
See application file for complete search history.

(56) References Cited

U.S. PATENT DOCUMENTS

2020/0367196 A1\* 11/2020 Chen ................. H04W 56/001
2021/0084603 A1   3/2021 Zisimopoulos et al.
2021/0250884 A1\* 8/2021 Iyer .................. H04W 56/0045

FOREIGN PATENT DOCUMENTS

WO    2020067829 A1    4/2020

OTHER PUBLICATIONS

Huawei: "(TP for Son BLCR for 38.473) Coverage and Capacity Optimization", 3GPP TSG-RAN WG3 Meeting #112-e, R3-212209, 3rd Generation Partnership Project, Mobile Competence Centre, 650, Route Des Lucioles, F-06921 Sophia-Antipolis Cedex, France, vol. RAN WG3, No. E-meeting, May 17, 2021-May 28, 2021, May 6, 2021, XP052001553, 25 Pages, paragraph [03.1].
International Search Report and Written Opinion—PCT/US2022/027340—ISA/EPO—dated Aug. 25, 2022.

\* cited by examiner

*Primary Examiner* — Kyaw Z Soe
(74) *Attorney, Agent, or Firm* — Procopio, Cory, Hargreaves & Savitch LLP

(57) ABSTRACT

Aspects presented herein may enable a transmitting entity, such as a base station, to indicate to one or more receiving entities that SSBs of one or more cells (which may include the transmitting entity) are to be transmitted with modified configurations. The method may also enable the transmitting entity to transmit modified SSBs to enable network energy saving. In one aspect, a base station configures one or more cells of a plurality of cells with one or more modified SSBs associated with an ES mode. The base station transmits an indication of the one or more cells associated with a transmission of the one or more modified SSBs, the transmission of the one or more modified SSBs corresponding to an ES mode at the one or more cells, the one or more cells being associated with the base station or at least one other base station.

30 Claims, 21 Drawing Sheets

MODIFIED SYNCHRONIZATION SIGNAL BLOCK FOR NETWORK ENERGY SAVING

TECHNICAL FIELD

The present disclosure relates generally to communication systems, and more particularly, to wireless communication involving synchronization signal block (SSB).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus configures one or more cells of a plurality of cells with one or more modified synchronization signal blocks (SSBs) associated with an energy saving (ES) mode. The apparatus transmits an indication of the one or more cells associated with a transmission of the one or more modified SSBs, the transmission of the one or more modified SSBs corresponding to an ES mode at the one or more cells, the one or more cells being associated with the base station or at least one other base station.

In an aspect of the disclosure, a method, a computer-readable medium, and an apparatus are provided. The apparatus receives an indication of one or more cells associated with a reception of one or more modified SSBs, the reception of the one or more modified SSBs corresponding to an ES mode at the one or more cells, the one or more cells being associated with at least one base station. The apparatus receives the one or more modified SSBs associated with the ES mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
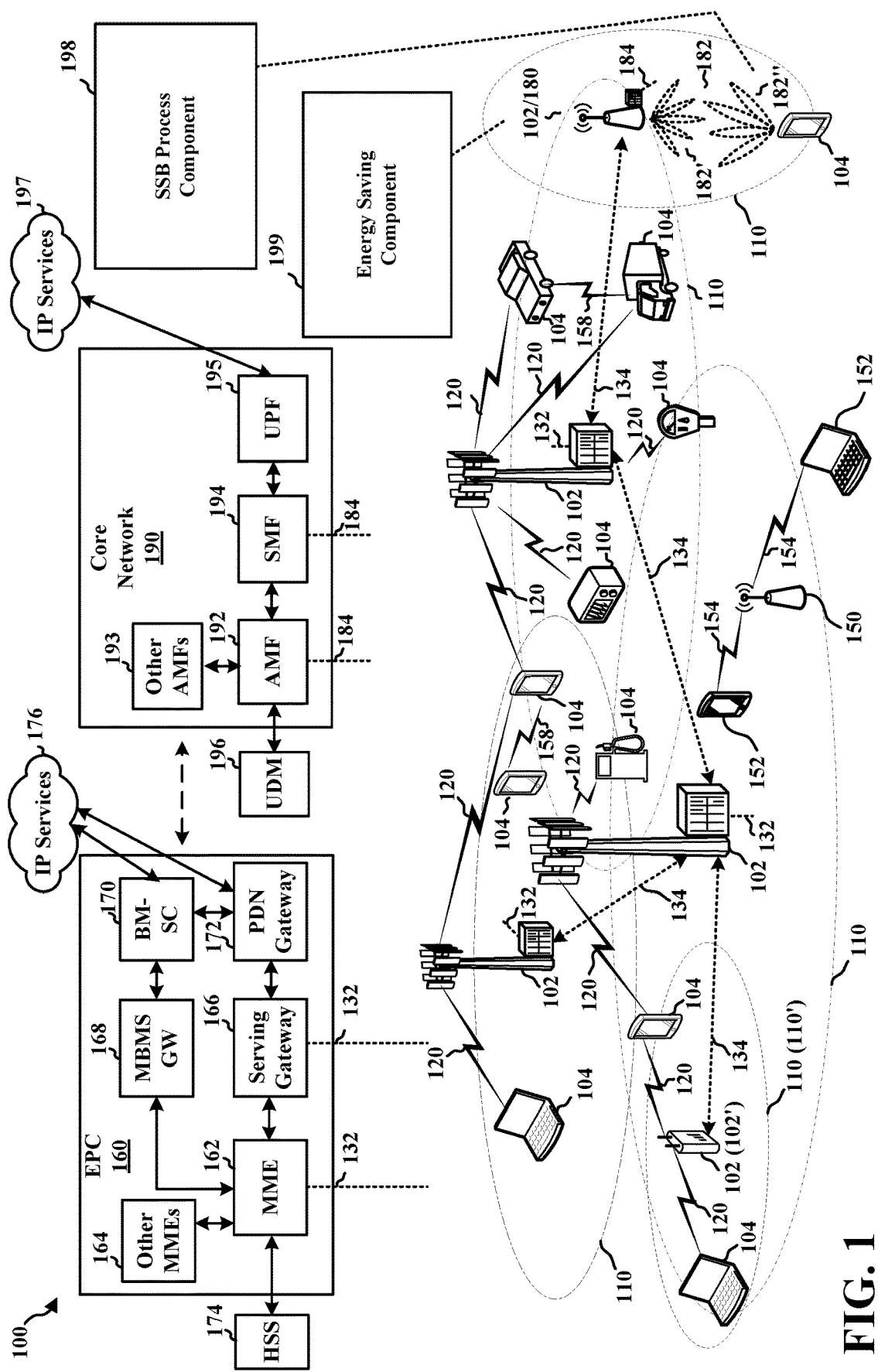
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable SSBs of a cell to be modified to enable network energy saving. For example, for cells operating under an energy saving mode, the cell may be configured to transmit/broadcast SSBs with modified configurations (e.g., to transmit contents and/or duration of SSBs differently while still making sure they are discoverable) to reduce the time-domain footprint of periodic SSBs. Similarly, for cells in a compensating mode, the cells may also be configured to transmit SSBs with modified configurations (e.g., to make sure they may still provide extended coverage to compensate for the neighboring dormant cells).

In certain aspects, the base station 102/180 may include an energy saving component 199 configured to transmit/broadcast SSBs with modified configurations during one or more ES modes. In one configuration, the energy saving component 199 may be configured to configure one or more cells of a plurality of cells with one or more modified SSBs associated with an ES mode. In such configuration, the energy saving component 199 may transmit an indication of the one or more cells associated with a transmission of the one or more modified SSBs, the transmission of the one or more modified SSBs corresponding to an ES mode at the one or more cells, the one or more cells being associated with the base station or at least one other base station.

In certain aspects, the UE 104 may include an SSB process component 198 configured to receive SSBs with modified configurations from base stations that are in an ES mode. In one configuration, the SSB process component 198 may be configured to receive an indication of one or more cells associated with a reception of one or more modified SSBs, the reception of the one or more modified SSBs corresponding to an ES mode at the one or more cells, the one or more cells being associated with at least one base station. In such configuration, the SSB process component 198 may receive the one or more modified SSBs associated with the ES mode.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
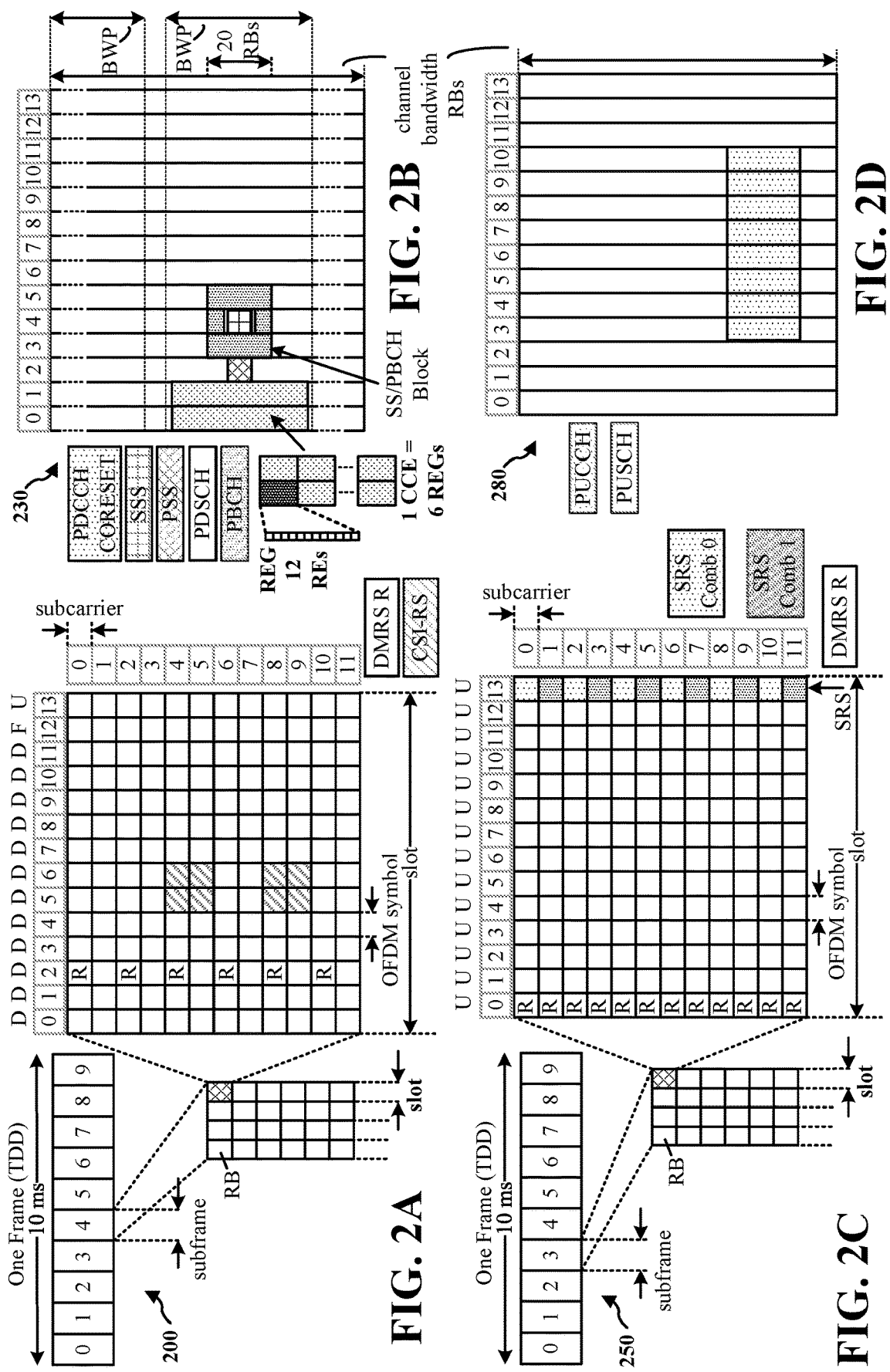
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
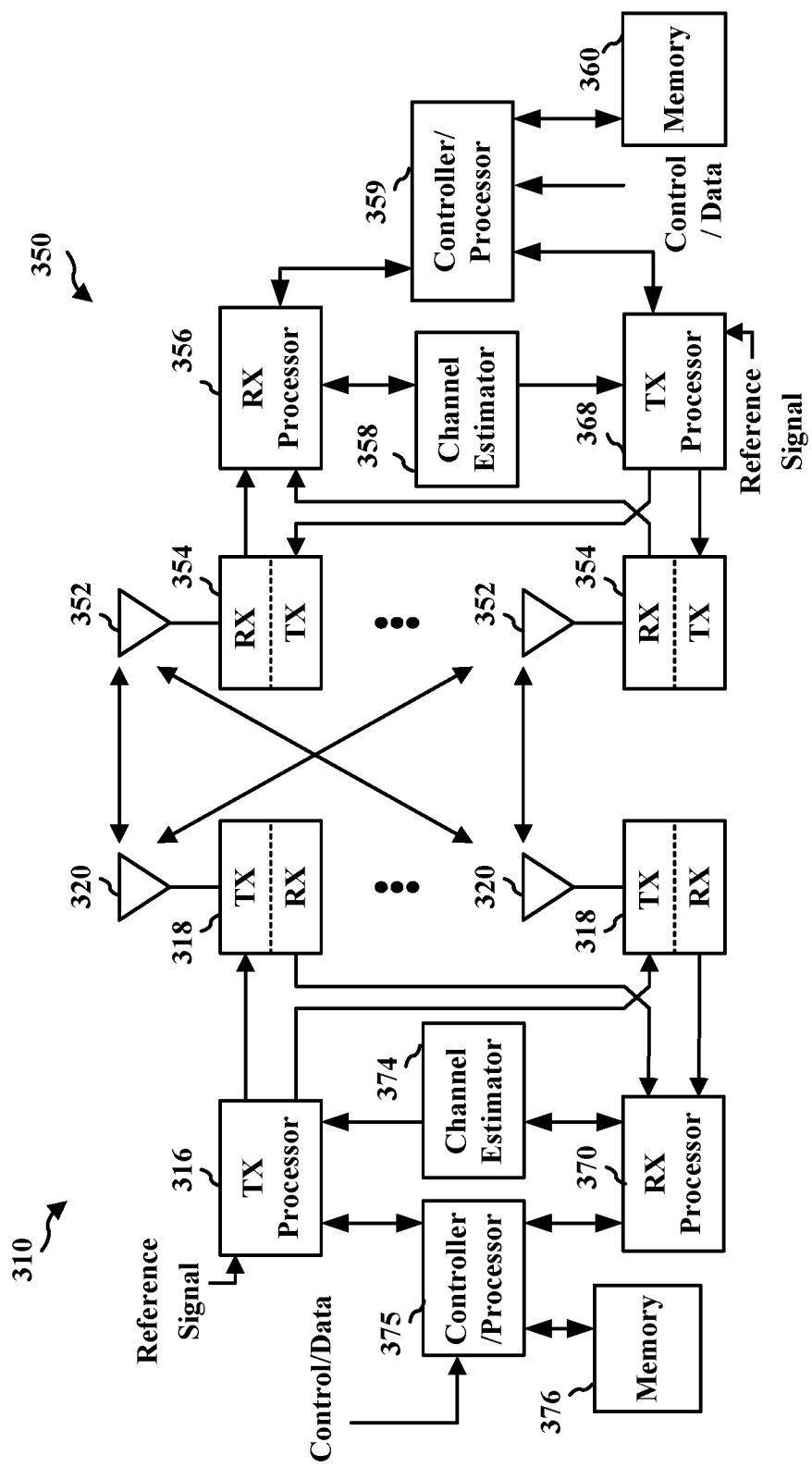
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB process component 198 of FIG. 1.

At least one of the TX processor 316, the RX processor 370, and the controller/processor 375 may be configured to perform aspects in connection with the energy saving component 199 of FIG. 1.

A UE may perform a cell search to obtain time and/or frequency synchronization with a cell (e.g., a base station) and to obtain a cell identifier (ID), such as physical layer cell ID (PCI) of the cell. The UE may also learn the signal quality and other information about the cell based on the PCI. The UE may perform the cell search for a defined frequency range before the UE selects or re-selects a cell. In some examples, a UE may perform the cell search when the UE is powered ON, when the UE is moving (e.g., under the mobility in connected mode), and/or when the UE is in an idle/inactive mode (e.g., the UE may perform a cell reselection procedure after the UE camps on a cell and stays in the idle mode), etc.

To perform the cell search (e.g., the initial cell search and/or the cell reselection, etc.), a UE may use/decode synchronization signal(s) transmitted from one or more cells, where the UE may obtain or derive information related to the one or more cells and/or their access information based on the synchronization signal(s). In one example, a cell may transmit one or more types of synchronization signals, such as a primary synchronization signal (PSS) and a secondary synchronization signal (SSS), along with a physical broadcast channel (PBCH), in a synchronization signal block (SSB) to UEs within its transmission range, e.g., as described in connection with FIG. 2B. The UE may perform the cell search based on the SSB. In some examples, a UE may first decode a PBCH before the UE may receive other system information transmitted on a physical downlink shared channel (PDSCH).

Figure 4:
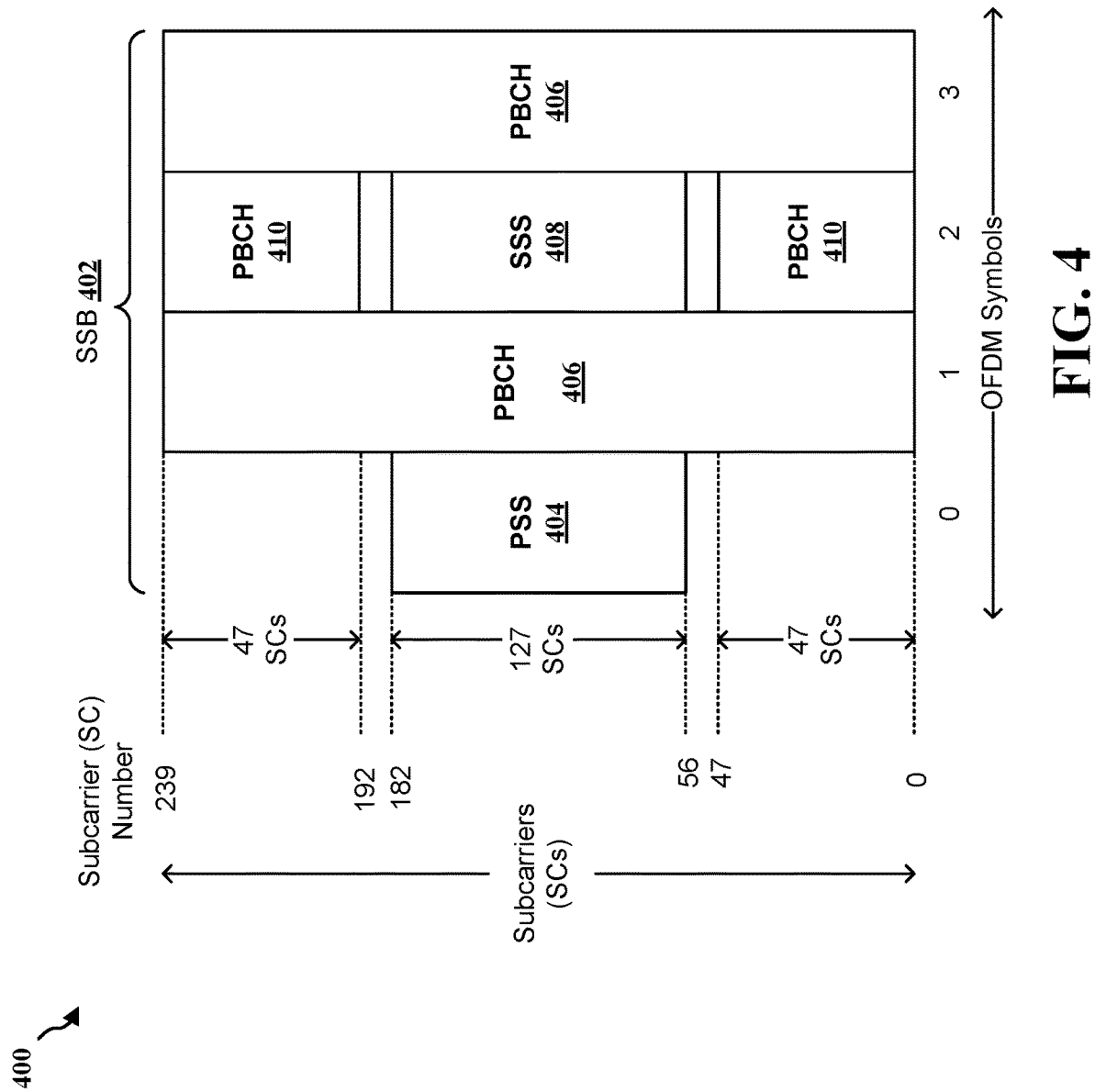
FIG. 4 is a diagram illustrating an example synchronization signal block (SSB) in accordance with various aspects of the present disclosure.

FIG. 4 is a diagram 400 illustrating an example SSB in accordance with various aspects of the present disclosure. An SSB 402 may span four (4) OFDM symbols with one (1) symbol for a PSS 404, two (2) symbols for PBCH 406, and one (1) symbol with an SSS 408 and PBCH 410 that are frequency division multiplexed (FDMed). The length of an OFDM symbol or a slot may be scaled with subcarrier spacing (SCS), and there may be seven (7) or fourteen (14) symbols per slot. For example, different frequency ranges may have different SCS, where 15, 30, and/or 60 kHz SCS may be used for the lower frequency bands (e.g., the FR1), and 60, 120, and/or 240 kHz SCS may be used for the higher frequency bands (e.g., the FR2). In one example, the PSS 404 may be mapped to 127 subcarriers (SCs) around the center frequency of the SSB 402, where the PSS 404 may use a length 127 frequency domain-based M-sequence (e.g., made up of 127 M-sequence values), which may have up to three (3) possible sequences. The M-sequence may also be referred to as a maximum length sequence (MLS), which may be a type of pseudorandom binary sequence. The SSS 408 may also be mapped to 127 SCs and may use a length 127 frequency domain-based Gold Code sequence (e.g., two (2) M-sequences are used), which may have up to 1008 possible sequences. A UE may use the information included in the PSS 404 and/or the SSS 408 for downlink frame synchronization and for determining the physical cell ID of the cell. The PBCH 406 and/or 410 may be modulated with quadrature phase shift keying (QPSK), which may be coherently demodulated by a UE using the associated DMRS carried in the PBCH 406 and/or 410. The PBCH 406 and/or 410 may include the master information block (MIB) part of the MAC layer broadcast channel (BCH). The other part of the BCH, such as the system information block (SIB), may be included in a PDSCH allocation encoded with the system information-radio network temporary identifier (SI-RNTI).

During an initial cell search or a cell reselection, a UE searching for a cell may use a sliding window and correlation technique to look for the PSS 404. For example, the UE may use a sliding window with a length of one (1) symbol to try to correlate one or more possible PSS sequences as the UE may not know which SCs are used by the PSS 404. In addition, due to the Doppler, internal clock frequency shifts, and/or other frequency errors associated with the PSS 404, the UE may use different timing hypothesis and/or frequency hypothesis to account for these errors. For example, for each timing hypothesis, the UE may try to use all three sequences+N frequency hypothesis to account for the Doppler, internal clock frequency shifts, and any other frequency errors, etc.

In some examples, the timing and/or frequency for a PSS (e.g., the PSS 404) may not be known to a UE. As such, a UE may use the PSS for symbol timing and/or initial frequency offset estimations. The cell ID ($N_{ID}^{cell}$) of a cell may be in two parts, where $N_{ID}^{cell}=3N_{ID}^{(1)}+N_{ID}^{(2)}$. The PSS may include the cell ID part 2 ($N_{ID}^{(2)}$), which may have one (1) out of three (3) possible values, e.g., $N_{ID}^{(2)}=0,1,2$. After the UE decodes the PSS, the UE may know the estimated timing and/or the frequency for an SSS (e.g., the SSS 408) associated with the PSS. Then, the UE may search for or correlate the associated SSS based on the estimated timing and/or the frequency. The SSS may include the cell ID part 1 ($N_{ID}^{(1)}$), which may have one (1) out of 366 possible values. The SSS may be based on two M-sequences (e.g., the Gold Code sequence), where an M-sequence may be a pseudo-random binary sequence which may be created by cycling through every possible state of a shift register of length n, resulting in a sequence of length $2^n-1$. For example, the SSS may include two cyclic shifts: $m_0=$ $$\left(3\left\lfloor\frac{N_{ID}^{(1)}}{112}\right\rfloor+N_{ID}^{(2)}\right)5 \text{ and } m_1=\left(N_{ID}^{(1)}\bmod 112\right),$$

where the indices $m_0$ and $m_1$ may be derived from the $N_{ID}^{(2)}$ to determine the cyclic shifts.

Referring back to FIG. 4, based on the PSS 404 and/or the SSS 408, the UE may know the timing and/or frequency of the PBCH 406 and 410 (collectively as the PBCH) within the SSB 402. The PBCH may include 576 resource elements (REs) (e.g., 1 RE=1 SC×1 symbol), where 576 REs=240×2 (at symbols one and three)+(48+48) (at symbols two)=number of REs. The PBCH may carry the MIB and DMRS, and the PBCH may be modulated with QPSK. The UE may perform coherent demodulation of the PBCH based on the DMRS carried in the PBCH. In addition, the UE may use the DMRS to perform channel estimation. In one example, the DMRS may carry, or be used by the UE to determine, three (3) least significant bits (LSB) (e.g., for the FR2) of an SSB index per half frame from a DMRS sequence index. For example, under the FR2, a base station or one or more transmission reception points (TRPs) of a base station may communicate with a UE using more than one beam (e.g., up to 64 beams), where each beam may correspond to one beam index. In some examples, each beam index may further be associated with an SSB index, such that the base station may indicate to the UE which beam(s) may be used by the base station for transmission through the SSB index. As a base station or TRP(s) of a base station may use up to 64 beams, the SSB index may be six (6) bits long (e.g., $2^6=64$), where three (3) bits may be carried in the DMRS, and the other three bits may be multiplexed with the PBCH (e.g., as shown by "MSB of SSB index" within FIG. 5). In some examples, the DMRS may be interleaved (e.g., in frequency) with the PBCH data at every $4^{th}$ SC (e.g., RE), such that the DMRS may include 144 REs (e.g., 60×2+12+12). The UE may use the DMRS, the SSS (e.g., 508) and/or the PSS (e.g., 504) signals in an SSB (e.g., 502) to refine the frequency offset estimation.

Figure 5:
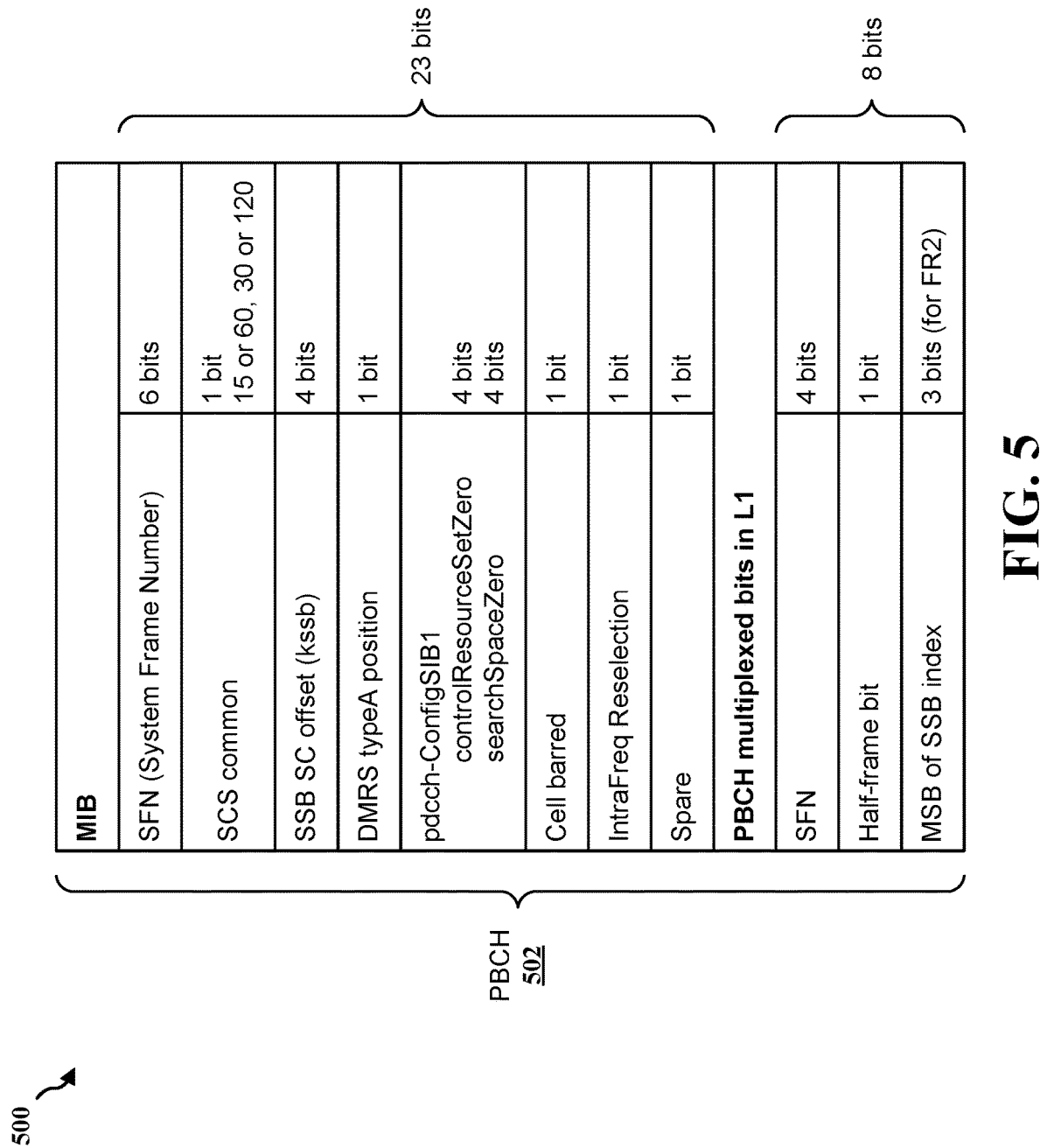
FIG. 5 is a diagram illustrating an example of information that may be included in physical broadcast channel (PBCH) of an SSB in accordance with various aspects of the present disclosure.

FIG. 5 is a diagram 500 illustrating an example of information that may be included in a PBCH of an SSB in accordance with various aspects of the present disclosure. A PBCH 502 may be thirty-one (31) bits long, such as for a network operating within the FR2, and the PBCH 502 may include one or more parameters that may be used by a UE to decode a system information block type one (SIB1) message (e.g., SIB1 PDSCH). For example, the MIB within the PBCH 502 may carry a pdcch-ConfigSIB1 field that includes a parameter for an initial CORESET (e.g., a controlResourceSetZero parameter) and a parameter for an initial search space set (e.g., a searchSpaceZero parameter). The controlResourceSetZero parameter may guide the UE to a CORESET0, where the CORESET0 may carry a PDCCH that has information for scheduling a SIB1 PDSCH. For example, the controlResourceSetZero parameter may be four (4) bits long, and the UE may use this parameter to determine a multiplexing pattern (discussed below) and the CORESET0's frequency offset, number of resource blocks (RBs) and/or number of symbols, etc. The searchSpaceZero parameter may be four (4) bits long, and the UE may use this parameter to determine the CORESET0's time location. Thus, based on the information included in the controlResourceSetZero parameter and/or the searchSpaceZero parameter, the UE may identify or determine the location (e.g., in time and/or frequency) of the CORESET0.

Figure 6:
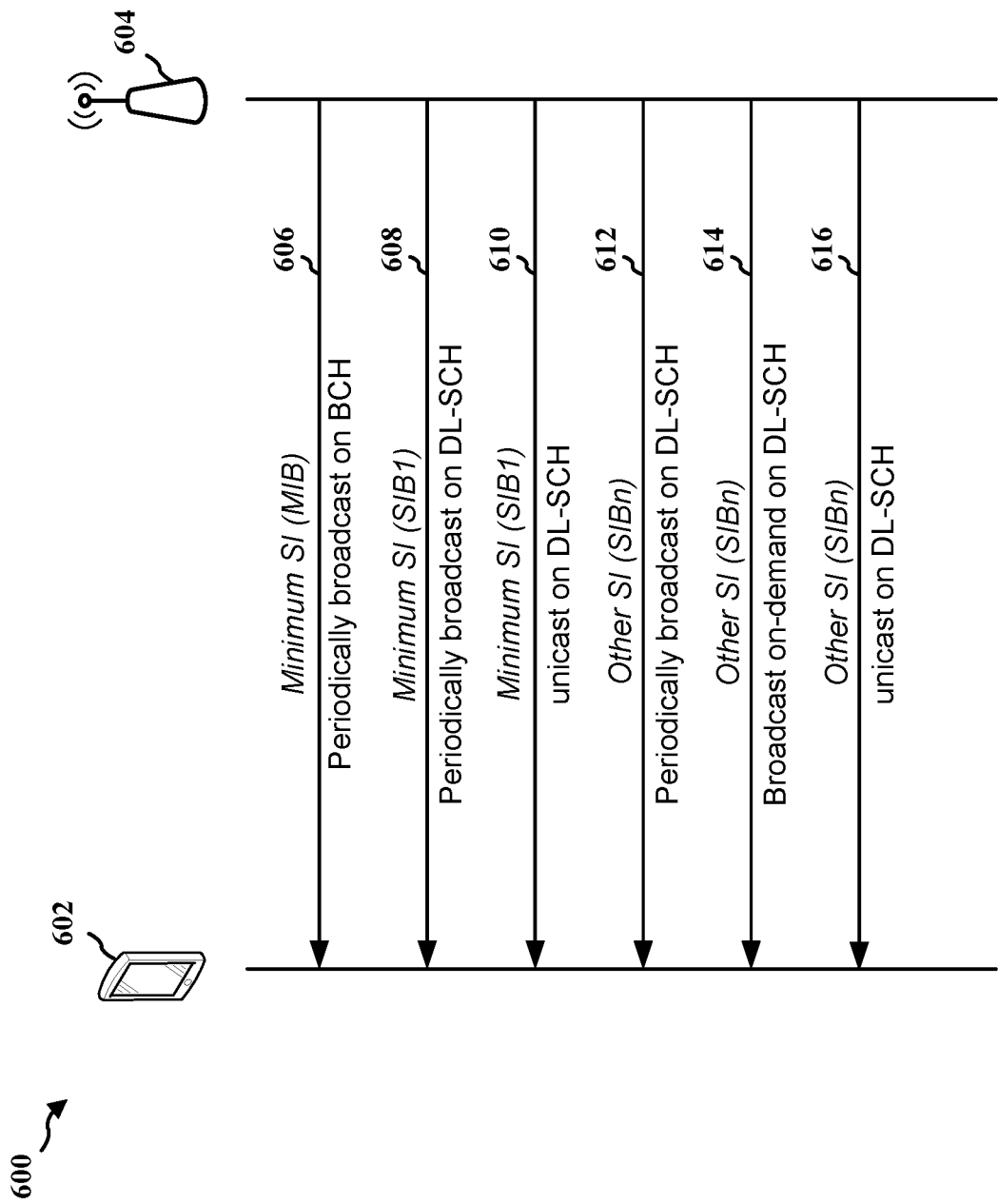
FIG. 6 is a communication flow illustrating an example system information block (SIB) transmissions in accordance with various aspects of the present disclosure.

As described in connection with FIGS. 2B and 4, system information (SI) (e.g., the PBCH) may include a MIB and a number of SIBs. FIG. 6 is a communication flow 600 illustrating example SIB transmissions in accordance with various aspects of the present disclosure. As shown by the communication flow 600, the system information may be divided into multiple minimum SI (e.g., 606, 608, 610) and other SI (e.g., 612, 614, 616). The minimum SI (e.g., 606, 608, 610) may include basic information for a UE 602's initial access to a cell 604 (e.g., base station) and information for acquiring any other system information. For example, minimum SI may include a MIB 606, which may contain cell barred status information and physical layer information of the cell 604 for receiving further system information (e.g., CORESET#0 configuration). The cell 604 may broadcast the MIB 606 periodically on a broadcast channel (BCH). The minimum SI may also include a SIB1 (e.g., 608 and/or 610), where the SIB1 may define the scheduling of other system information blocks and may contain information for the UE's initial access to a base station, such as the random access parameters. For examples, the SIB1 may include information regarding the availability and scheduling of other SIBs (e.g., mapping of SIBs to SI message, periodicity, SI-window size, etc.). The SIB1 may also indicate whether one or more SIBs is provided based on on-demand, in which case, it may also provide PRACH configuration for the UE to request for the SI. The SIB1 may further contain RRC information that is common for all UEs and cell barring information applied to the unified access control. The SIB1 (e.g., 608 and/or 610) may be referred to as the remaining minimum SI (RMSI), which may be periodically broadcasted by the cell 604 on a downlink-share channel (DL-SCH) (e.g., using SIB1 608) or transmitted to a dedicated UE (e.g., RRC connected) on the DL-SCH (e.g., using SIB1 610). The other SI (e.g., SIBn 612, 614, 616) may include other SIBs not being broadcasted in the minimum SI (e.g., 606, 608, 610). The other SI may be periodically broadcasted by the cell 604 on the DL-SCH, broadcasted on-demand on the DL-SCH (e.g., requested by the UE 602), or transmitted in a dedicated manner on the DL-SCH to one or more UEs including the UE 602. For example, SIB2 may include cell re-selection information, SIB3 may include information about the serving frequency and intra-frequency of the neighboring cells relevant for cell re-selection, etc.

Figure 7:
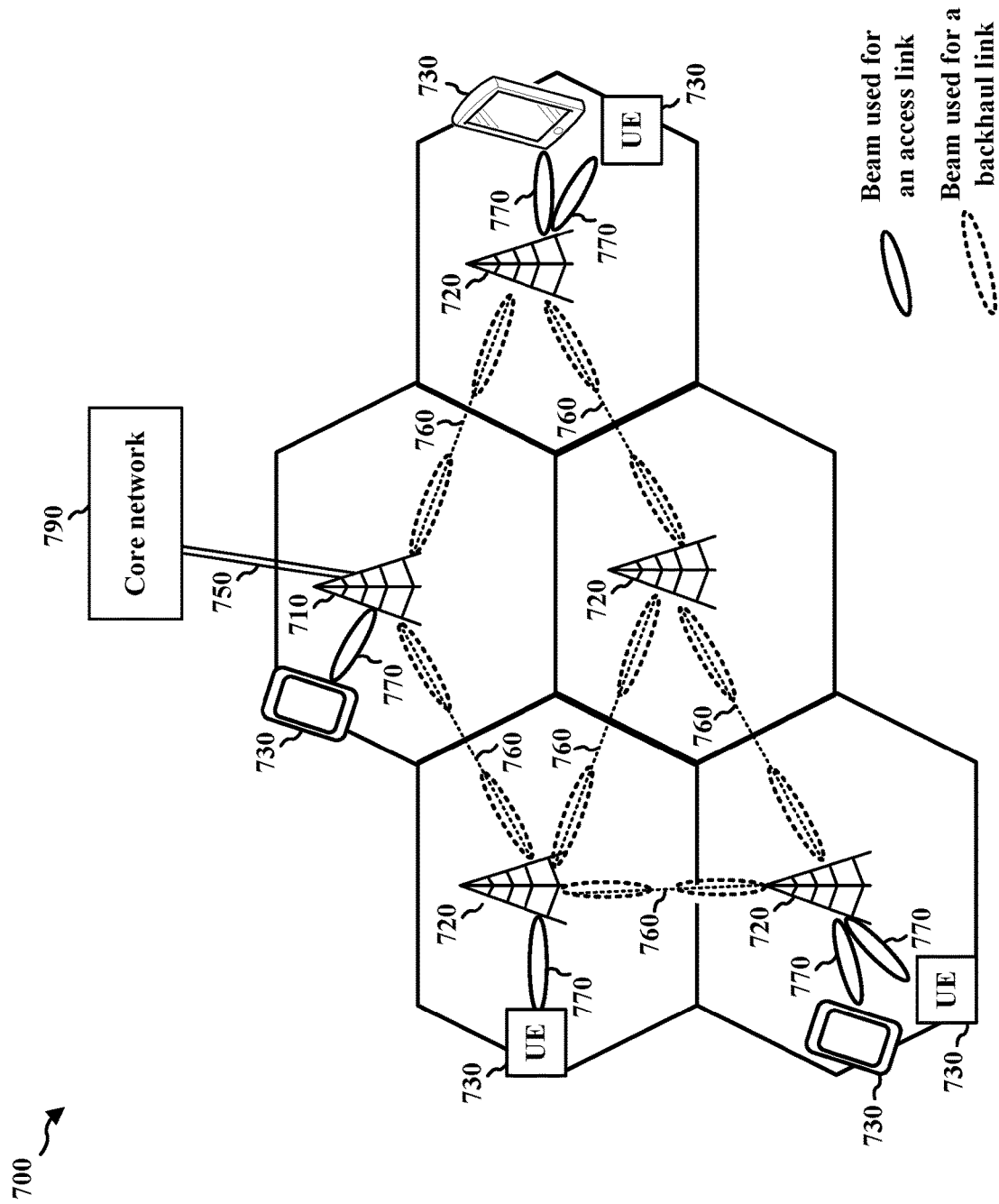
FIG. 7 is a diagram illustrating an example Integrated Access and Backhaul (IAB) network in accordance with various aspects of the present disclosure.

FIG. 7 is a diagram illustrating an example Integrated Access and Backhaul (IAB) network 700 in accordance with various aspects of the present disclosure. The IAB network 700 may include an anchor node (that may be referred to herein as an "IAB donor") 710 and access nodes (that may be referred to herein as "IAB nodes") 720. The IAB donor 710 may be a base station, such as a base station 102 or 180 described in connection with FIG. 1, and may perform functions to control the IAB network 700. The IAB donor 710 may provide a wireline connection to a core network 790. The IAB nodes 720 may include L2 relay nodes, etc., that relay traffic between the IAB donor 710 and other IAB nodes and/or UEs. Together, the IAB donor 710 and the IAB nodes 720 may share resources to provide an access network and a backhaul network to the core network 790. For example, resources may be shared between access links and backhaul links in the IAB network.

One or more UEs 730 may interface with the IAB nodes 720 or the IAB donor 710 through access links 770. The IAB nodes 720 may communicate with each other and with the IAB donor 710 through backhaul links 760. The IAB donor 710 may be connected to the core network 790 via a wireline backhaul link 750. The UEs 730 may communicate with the core network 790 by relaying messages through their respective access link 770 to the IAB network 700, which then may relay the message through backhaul links 760 to the IAB donor 710 to communicate to the core network 790 through the wireline backhaul link 750. Similarly, the core network may communicate with one of the UEs 730 by sending a message to the IAB donor 710 through the wireline backhaul link 750. The IAB donor 710 may send the message through the IAB network 700 via backhaul links 760 to the IAB node 720 connected to the one or more UEs 730, and the IAB node 720 may send the message to the one or more UEs 730 via the access link 770.

Figure 8:
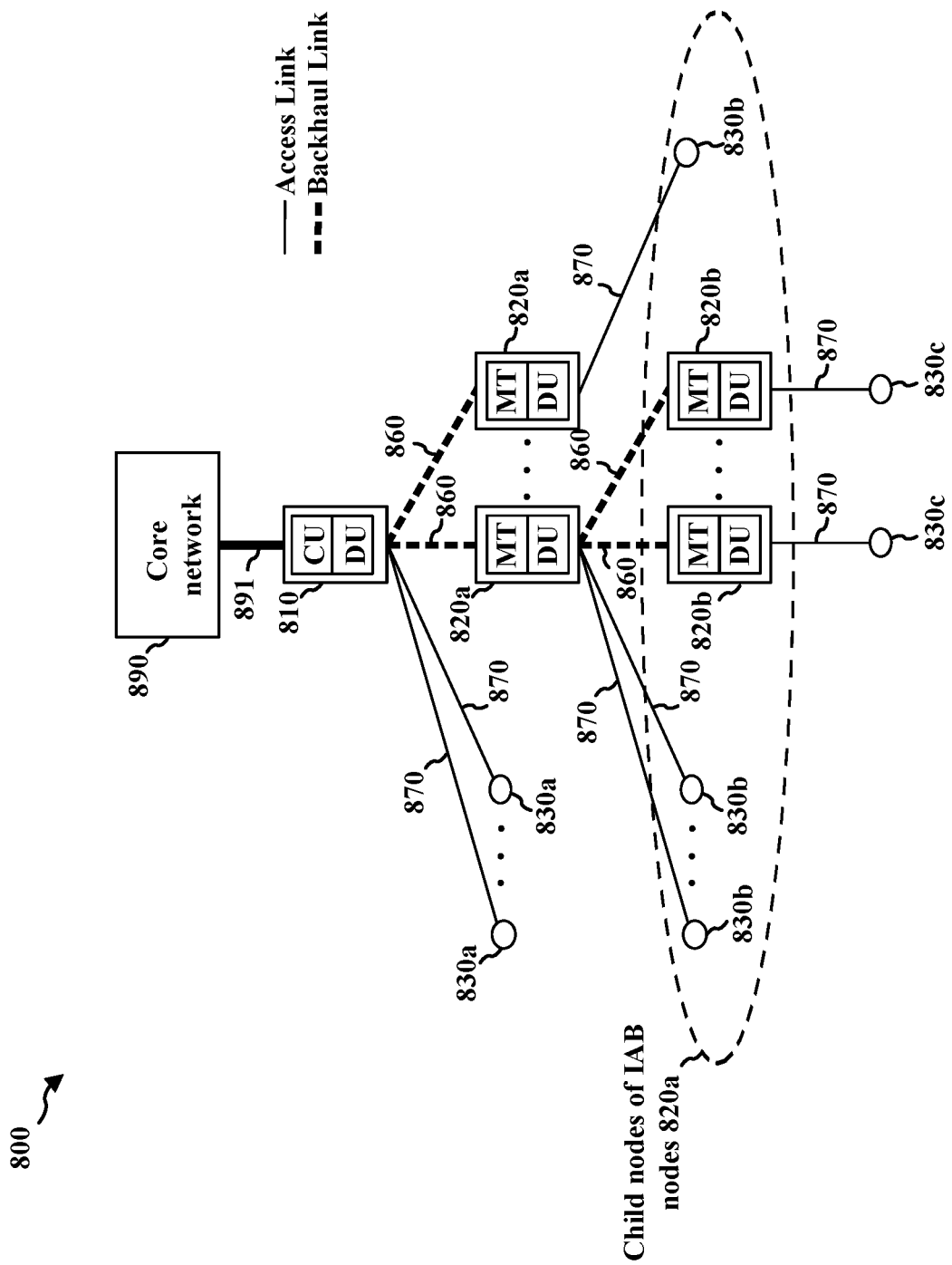
FIG. 8 is a diagram illustrating another example of an IAB network and components thereof in accordance with various aspects of the present disclosure.

FIG. 8 is a diagram illustrating another example of an IAB network 800 and components thereof in accordance with various aspects of the present disclosure. The IAB network 800 includes an IAB donor 810 and IAB nodes 820a and 820b. The IAB nodes 820a and 820b, as well as the IAB donor 810, may provide wireless access links 870 to UEs 830a and 830b, respectively.

The IAB donor 810 may be considered a root node of the tree structure of the IAB network 800. The IAB donor 810 may be connected to the core network 890 via a wired connection 891. The wired connection may include, e.g., a wireline fiber. For example, the IAB donor 810 may provide a connection to one or more IAB nodes 820a. The IAB nodes 820a may each be referred to as a child node of the IAB donor 810. The IAB donor 810 may also provide a connection to one or more UEs 830a, which may be referred to as a child UE of the IAB donor 810. The IAB donor 810 may be connected to its child IAB nodes 820a via backhaul links 860, and may be connected to the UEs 830a via access links 870. The IAB nodes 820a that are children nodes of IAB donor 810 may also have IAB node(s) 820b and/or UE(s) 830b as children. For example, IAB nodes 820b may further connect to child nodes and/or child UEs. FIG. 8 illustrates IAB nodes 820b providing an access link to UEs 830c, respectively.

The IAB donor 810 may include a central unit (CU) and a distributed unit (DU). The central unit CU may provide control for the IAB nodes 820a, 820b in the IAB network 800. For example, the CU may be responsible for configuration of the IAB network 800. The CU may perform RRC/PDCP layer functions. The DU may perform scheduling. For example, the DU may schedule resources for communication by the child IAB nodes 820a and/or UEs 830a of the IAB donor 810.

The IAB nodes 820a, 820b may include a mobile termination (MT) and a DU. The MT of IAB node 820a may operate as a scheduled node, scheduled similar to one of the UEs 830a by the DU of the parent node, e.g., IAB donor 810. The MT of IAB node 820b may operate as a scheduled node of parent node 820a. The DU may schedule the child IAB nodes 820b and UEs 830b of the IAB node 820a. As an IAB node may provide a connection to an IAB node that in turn provides a connection for another IAB node, the pattern of a parent IAB node including a DU that schedules a child IAB node/child UE may continue.

Figure 9:
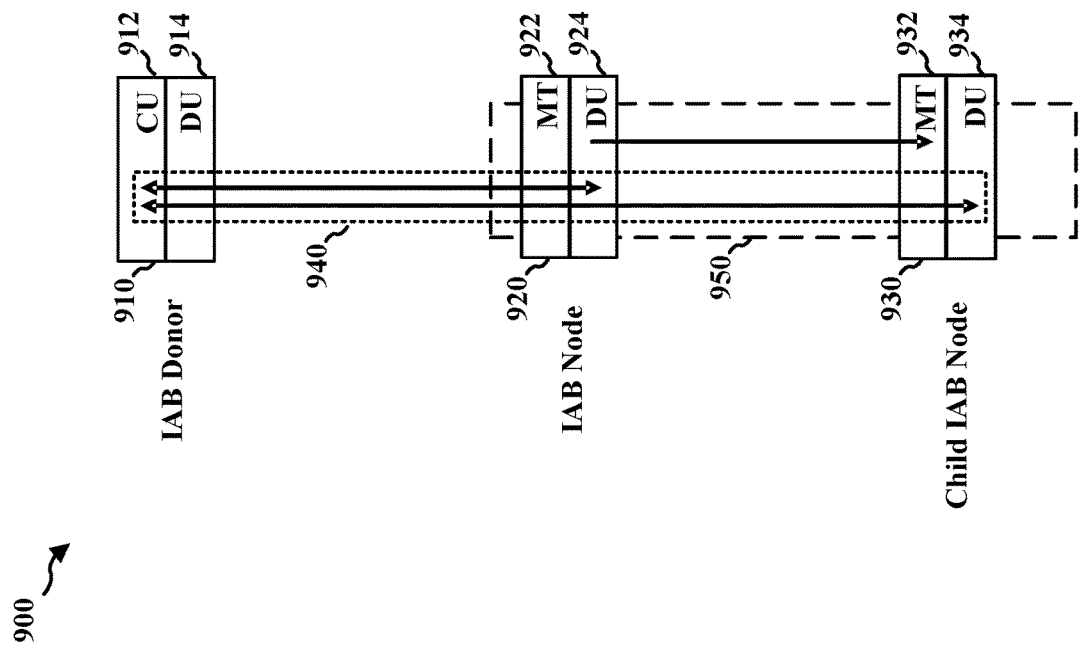
FIG. 9 illustrates examples of interaction between an IAB donor, an IAB node, and a child IAB node in accordance with various aspects of the present disclosure.

FIG. 9 illustrates examples of interaction 900 between an IAB donor 910, an IAB node 920, and a child IAB node 930 in accordance with various aspects of the present disclosure. The CU 912 of the IAB donor 910 may provide a centralized management of the resources available for communication of the IAB nodes. For example, the CU 912 of the IAB donor 910 may allocate the resources semi-statically. Additionally, or alternatively, the soft resources of a child node may be controlled in a distributed dynamic fashion by the parent of the child node (e.g., the DU 924 or 914 of the parent node). For example, the DU 924 of the IAB node 920 may allocate the soft resources of the child IAB node 930 through dynamic control signaling.

The MTs 922 and 932 may have resources that are downlink (DL) resources, uplink (UL) resources, or flexible (F) resources. In one example, the DUs 914, 924, and 934 may have hard DL resources, hard UL resources, and/or hard F resources. In another example, the DUs 914, 924, and 934 may have soft DL resources, soft UL resources, and/or soft flexible resources. In addition to hard or soft resources types, the DUs 914, 924, and 934 may have resources that are not available (NA) type resources.

The CU 912 of the IAB donor 910 may communicate with the DU 924 of the IAB node 920 and the DU 934 of the child IAB node 930 over an F1 interface 940. The F1 interface 940 may support exchanging information with or transferring encapsulated RRC messages to a child IAB node (e.g., the MT of a child of the receiving IAB node) (e.g., transferring an encapsulated RRC message for the child IAB node 930 to the DU 924 of the IAB node 920). In some aspects, the CU 912 may configure the resource pattern of the DU 924 of the IAB node 920 over the F1 interface 940.

The DU 924 of the IAB node 920 may communicate with the MT 932 of the child IAB node 930 over a Uu air interface 950. The Uu air interface 950 may support transferring RRC messages received from the CU 912 of the IAB donor 910 to the MT 932 of the child IAB node 930, and may support the DU 924 of the IAB node 920 dynamically scheduling the MT 932 of the child IAB node 930. In some aspects, the IAB node 920 may dynamically control the soft resources of the DU 934 of the child IAB node 930 over the Uu air interface 950.

Referring back to FIG. 4, for UEs to discovery a base station based on synchronization (or discovery) signals, such as based on SSBs (e.g., the SSB 402) transmitted from the base station, the base station may be configured to transmit/broadcast the SSBs with a dense periodicity (e.g., every 5 microseconds (ms), 10 ms, etc.). However, it may take a lot of power for a base station to transmit SSBs continuously and/or at a very short periodicity. Thus, if a region is deployed with multiple base stations, the power consumed by the base stations for transmitting the SSBs at the region may be significant.

In some examples, to provide energy saving for a group of base stations, some of the base stations within the group may be configured to go dormant (e.g., entering into an energy/power saving mode) for a duration, while some of the base station within the group may be configured to operate with an increased transmission power/range (e.g., entering into a compensating mode) to cover the base station(s) that are dormant for the duration. Then, a UE or a MT may be provided with multiple lists of reference signal IDs (e.g., physical cell ID (PCI) lists) to search for, which may correspond to different modes of activity at the neighboring integrated access and backhaul (IAB)-nodes/cells (e.g., one list of active nodes, and another list of dormant nodes, etc.).

In another example, one or more cells and/or IAB nodes may be associated with different levels of power-saving, where different levels of power-saving may provide different transmission (TX) power, periodicity of TX or reception (RX), number of TX/RX occasions per period (e.g., duty cycle), beam sweep configuration for measurement reference signal (RS)/broadcast signals and messages (e.g., number of beams, beam shape, etc.), and/or beam configuration for control/data communication (e.g., beam width), etc. compared to a fully active cell/IAB node (e.g., a cell or an IAB node not in power saving mode).

Aspects presented here may provide various power saving techniques and features for base station. Aspects presented herein may enable network nodes (e.g., cells, base stations) to save energy by configuring different power saving modes for the network nodes.

In one aspect of the present disclosure, one or more cells may be configured with at least one saving mode, and under the energy saving mode, SSBs of a cell may be modified to enable network energy saving. For example, for cells operating under an energy saving mode, the cell may be configured to transmit/broadcast SSBs with modified configurations (e.g., to transmit contents and/or duration of SSBs differently while still making sure they are discoverable) to reduce the time-domain footprint of periodic SSBs. Similarly, for cells in a compensating mode, the cells may also be configured to transmit SSBs with modified configurations (e.g., to make sure they may still provide extended coverage to compensate for the neighboring dormant cells).

Figure 10:
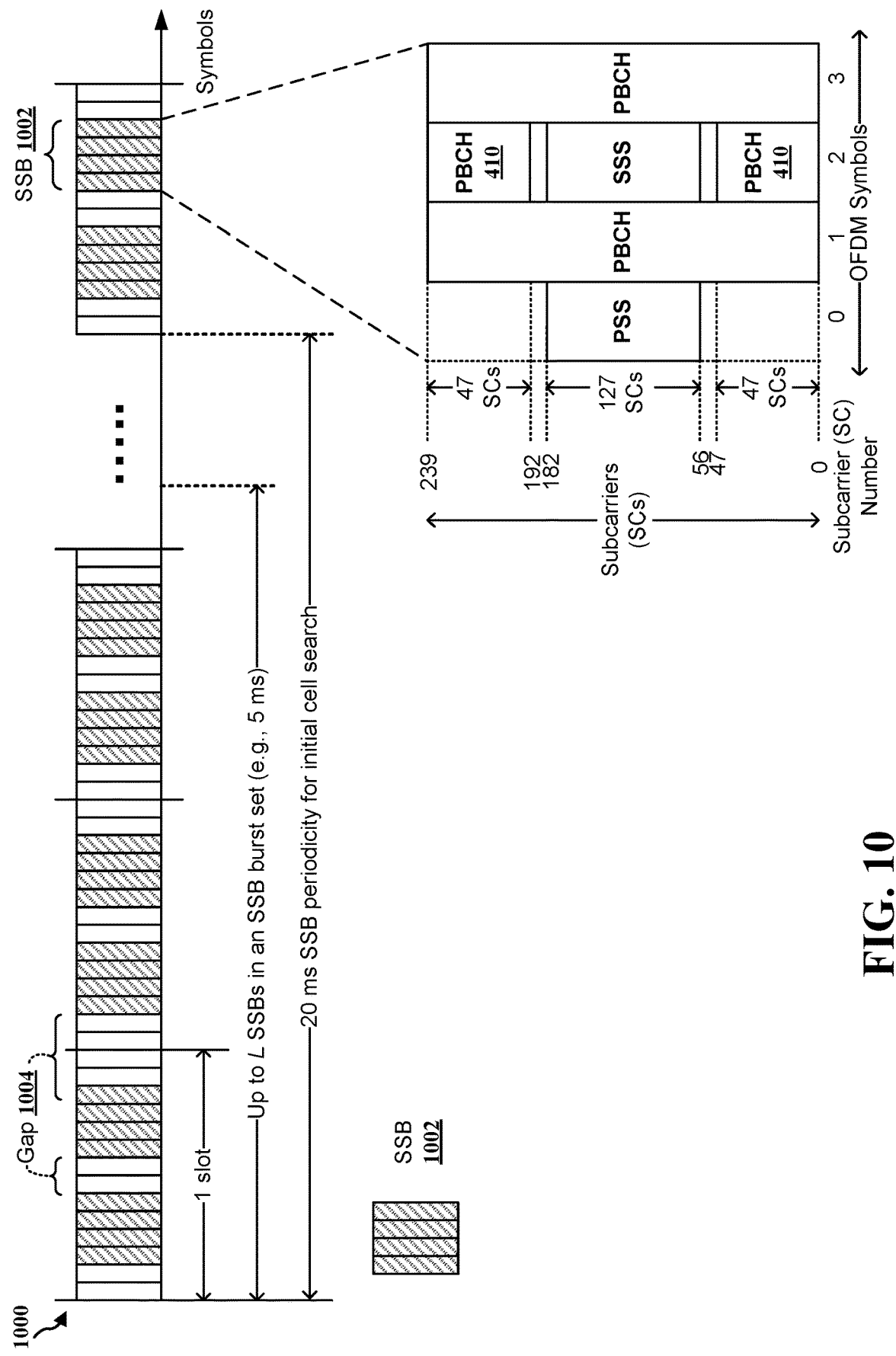
FIG. 10 is a diagram illustrating an example of multiple SSBs being transmitted in an SSB burst set in accordance with various aspects of the present disclosure.

FIG. 10 is a diagram 1000 illustrating an example of multiple SSBs being transmitted in an SSB burst set in accordance with various aspects of the present disclosure. As shown by the diagram 1000, an SSB 1002 may include one PSS symbol, one SSS symbol, and two (and more) PBCH symbols, such as discussed in connection with FIG. 4. The PBCH may carry a MIB that is used to provide system information for UEs/MTs for initial access (e.g., system information on how to receive RMSI), as well as timing related (e.g., including SSB index) information, such as described in connection with FIG. 5.

In one aspect of the present disclosure, as not all system information in a PBCH may be used for a discovery procedure by a receiving entity (e.g., the discovery of the cell transmitting the SSB), a transmitting entity may be configured to transmit SSBs without a PBCH to save power (e.g., to enter into micro sleep cycles). In other words, the transmitting entity may skip transmissions of a PBCH in an SSB, and/or the PBCH may be dropped from the SSB, etc. For purposes of the present disclosure a transmitting entity may be referring to a device that is capable of transmitting SSBs. For example, the transmitting entity may be a base station, a cell, a TRP, a CU, and/or a DU, etc. Similarly, a receiving entity may be referring to a device that is capable receiving SSBs. For example, the receiving entity may be a UE, an MT, a CU, and/or a DU, etc.

Figure 11:
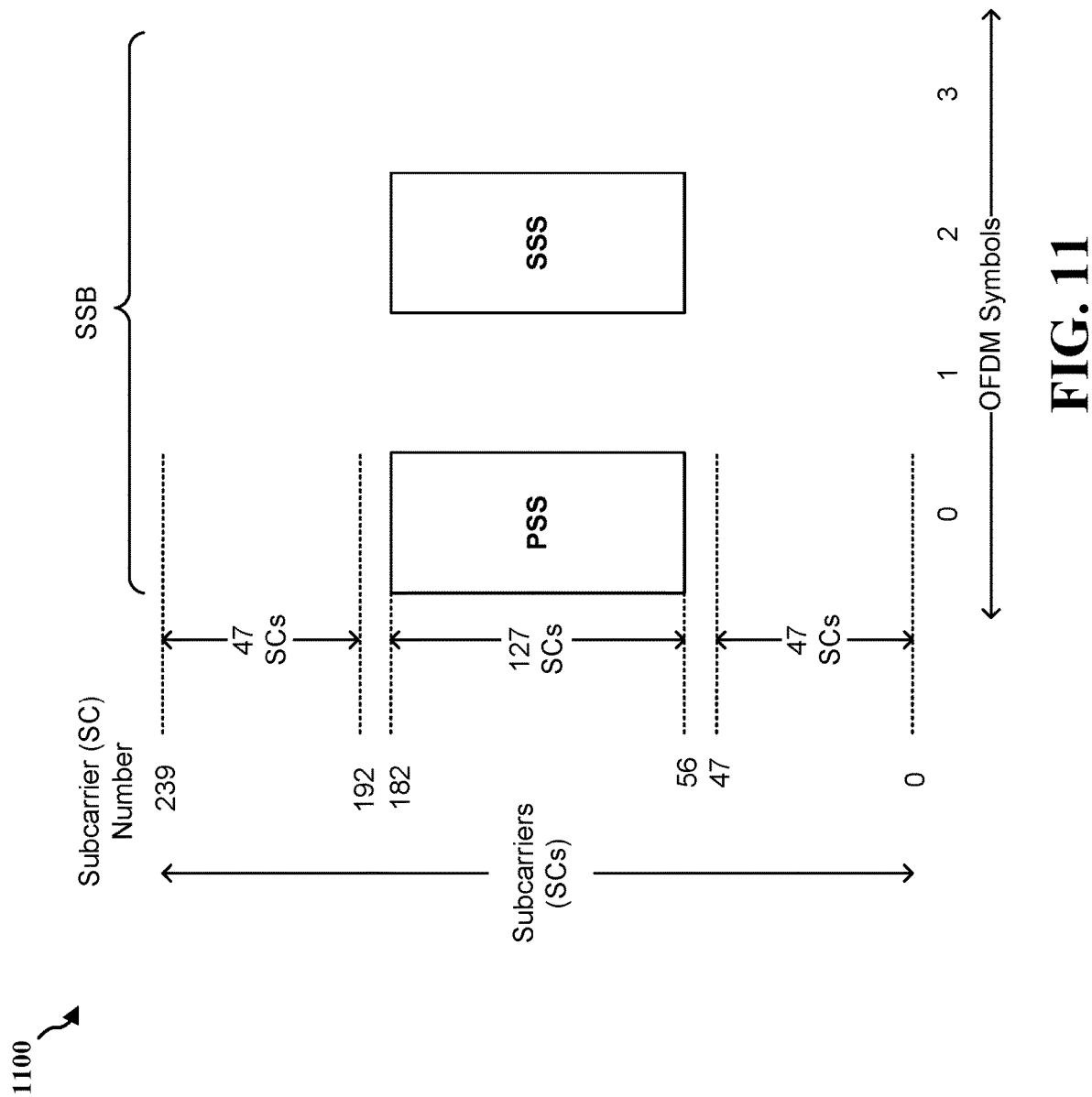
FIG. 11 is a diagram illustrating an example of an SSB without PBCH in accordance with various aspects of the present disclosure.

FIG. 11 is a diagram 1100 illustrating an example of an SSB without a PBCH in accordance with various aspects of the present disclosure. A transmitting entity in an ES mode may be configured to transmit (at least some of) its SSBs without a PBCH. The transmitting entity may also indicate to one or more receiving entities (e.g., UEs, MTs, etc.) which cells (e.g., neighboring cells) do not transmit a PBCH.

In one example, the transmitting entity may transmit the indication via an SMTC to one or more receiving entities (e.g., connected UEs) performing radio resource management (RRM) measurements. For example, the transmitting entity may include/add a new flag in the SMTC to indicate whether one or more cells are transmitting their SSBs with or without a PBCH within a configured SMTC window. Alternative, or additionally, a new or extra SMTC may be configured/provided for the cells who do not send a PBCH in their SSBs. Alternative, or additionally, the transmitting entity may include a list of PCIs in the SMTC to indicate cell(s) that are transmitting their SSBs with or without PBCH. In another example, the transmitting entity may transmit the indication in at least one of the SIBs (e.g., SIB2, SIB4, etc.) which may indicate one or more cells (e.g., neighboring cells) are transmitting their SSBs with or without a PBCH, etc.

In another example, an upper-layer signaling (e.g., for a backhaul (BH) network) may be used by a transmitting entity (e.g., a CU, a DU, etc.) for indicating whether SSBs transmitted from the transmitting entity include or does not include a PBCH (e.g., whether SSBs are sent with or without a PBCH). For example, the indication may be transmitted from a CU to a DU, or from a DU to a CU over an F1 interface, such as via updated STC configuration information, and/or TRP SSB configuration information, etc. In another example. The indication may be transmitted between CUs, such as via an Xn interface. In some examples, the CU and the DU may be associated with an IAB network. In other examples, the CU and the DU may be associated with one or more base stations. For example, the indication indicating whether SSBs include or does not include a PBCH may be transmitted between a base station CU (e.g., a gNB-CU) and a base station DU (e.g., a gNB-DU), e.g., from a first base station CU to a second base station DU, or from a first base station DU to a second base station CU, etc. In another example, the indication may be transmitted between base station CUs (e.g., between a first base station CU and a second base station CU).

Figure 12:
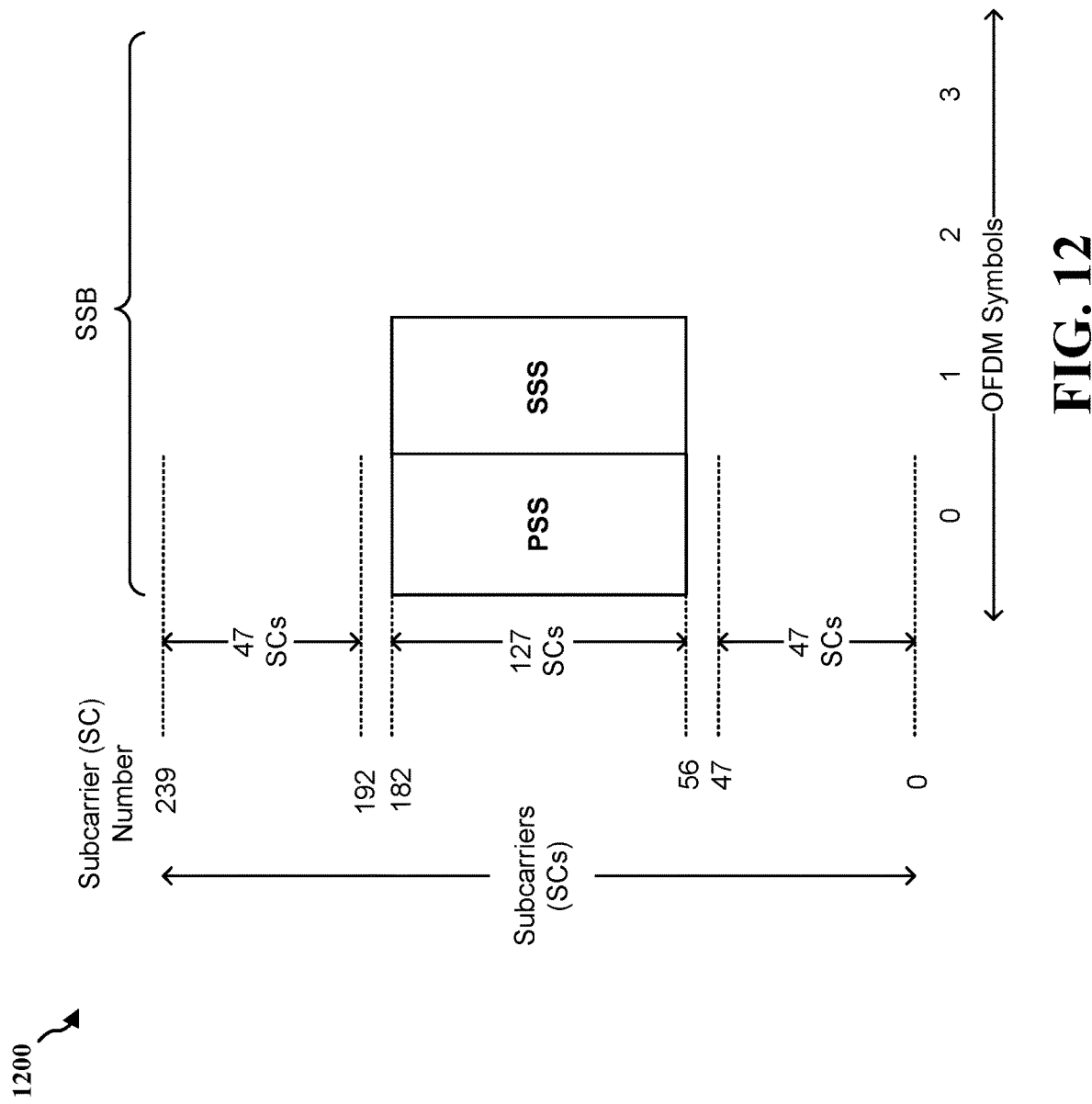
FIG. 12 is a diagram illustrating an example of transmitting PSS and SSS in consecutive symbols in accordance with various aspects of the present disclosure.

In some examples, when a transmitting entity is transmitting at least some SSBs without a PBCH, the PSS and SSS symbols for SSBs without a PBCH may be rearranged. For example, as shown by a diagram 1200 in FIG. 12, the transmitting entity may transmit PSS and SSS on consecutive symbols. Such configuration may reduce power consumption at the transmitting entity as the transmitting entity may avoid entering into a sleep/idle mode after the PSS is transmitted, and wake up from the sleep/idle mode when SSS is to be transmitted during the gap in which a PBCH is not transmitted. For example, referring to FIG. 11, if a transmitting entity is transmitting SSBs without a PBCH and the PSS is configured to be transmitted at symbol #0 while the SSS is configured to be transmitted at symbol #2, the transmitting entity may be configured to enter into an idle/sleep mode after the PSS is transmitted as there is nothing to be transmitted at symbol #1, and then the transmitting entity may be configured to wake up from the idle/sleep mode prior to symbol #2 for transmitting the SSS. Thus, by configuring the PSS and SSS to be transmitted in consecutive symbols as shown by the FIG. 12, the transmitting entity may schedule or configure longer or deeper idle/sleep cycles, which may enable additional energy saving. In addition, such configuration may also provide an additional advantage of enabling a phase continuity across PSS and SSS.

In another aspect of the present disclosure, instead of transmitting SSBs without a PBCH, a transmitting entity may transmit SSB with a modified PBCH that includes less information than an unmodified PBCH. In other words, a modified PBCH (e.g., a simpler version PBCH) may be configured for the transmitting entity that would carry information that is more useful/relevant for discovery purposes, and information not related to discovery purposes may be skipped/excluded from the modified PBCH.

Figure 13:
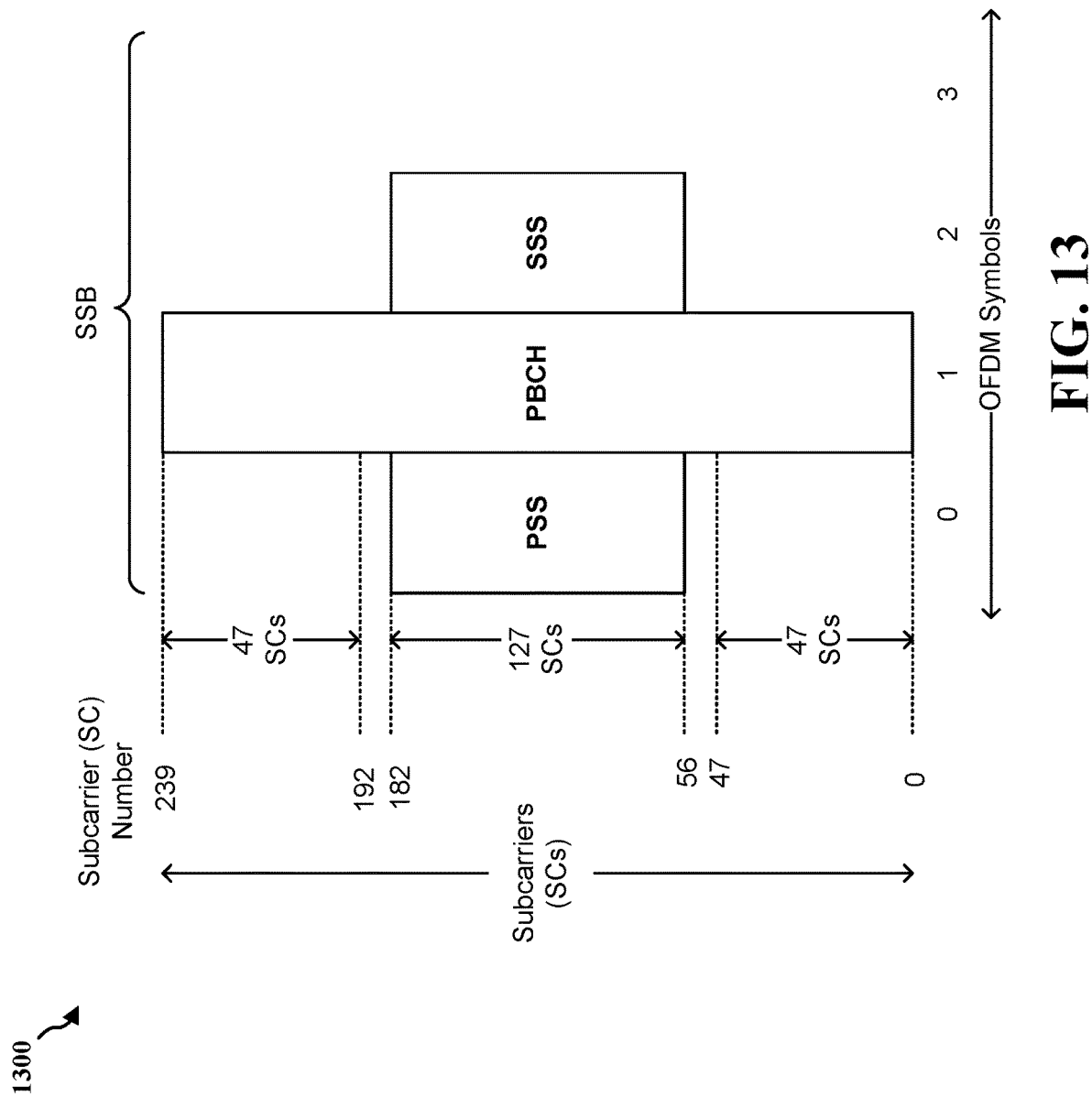
FIG. 13 is a diagram illustrating an example of a PBCH spanning over a reduced resource in accordance with various aspects of the present disclosure.

For example, a modified PBCH for an ES mode may include one or more of the followings: (1) an SSB index; (2) timing information (e.g., as part of SFN); (3) information about resources and/or configuration of transmitted SSBs (e.g., periodicity, TX power, beamforming configuration information—if there is a quasi-co-located (QCL) relation and/or repetition between some SSBs); (4) information about the ES mode and/or ES plan of the cell (e.g., when the cell changes/switches its ES mode); (5) information about RMSI request resources and/or configuration; (6) information about other neighboring cells that are not in ES mode (e.g., cells in non-ES mode, cells in compensating mode, etc.—this information may include any of the cell ID, frequency (raster) information), etc. In such an example, as the modified PBCH may include reduced amount of information (e.g., include system information relevant for discovery purposes), the modified PBCH may be configured to span over a reduced resource (e.g., one or two symbols, etc.), such as shown by a diagram 1300 in FIG. 13 (e.g., the PBCH may span over one symbol instead of two or three symbols).

In another aspect of the present disclosure, instead of modifying a PBCH or skipping/excluding transmission of a PBCH, a transmitting entity may be configured to modify the SSB burst pattern. In one example, a transmitting entity may be configured to transmit SSBs based on a more compact SSB burst pattern. For example, referring back to FIG. 10, a transmitting entity may be configured to transmit L SSBs in an SSB burst set (e.g., in a half-frame, 5 ms, etc.), where multiple gaps 1004 may be configured/provided between different SSBs to allow for other communications (e.g., data communications). In some examples, the location of the SSBs may be fixed or based on candidate locations in the SSB burst set (e.g., in the half-frame). However, as there may not be much traffic when a cell enters into an ES mode (e.g., the cell is unlikely to enter into an ES mode when the traffic is high or above a threshold), a more compact SSB sweep pattern (e.g., with less gaps) may reduce the time footprint and may allow more DTX and power saving. As such, the transmitting entity may transmit SSBs in a more compact setting, such as consecutively, which may avoid or reduce the occasions in which the transmitting entity enters into a sleep/idle mode during the gaps 1004. For purposes of the present disclosure, a compact SSB pattern or a more compact SSB sweep pattern may refer to an SSB pattern with less gaps between SSBs and/or an SSB pattern with higher SSB densities compared to a non-compact SSB pattern (e.g., a regular SSB pattern, a default SSB pattern, etc.). For example, if a default/regular SSB pattern is configured to transmit eight (8) SSBs in an SSB burst set (e.g., in a half-frame), a compact SSB pattern may be configured to transmit more than eight SSBs (e.g., twelve SSBs, sixteen SSBs, etc.) in an SSB burst set. In another example, if a default/regular SSB pattern is configured to transmit eight (8) SSBs with seven (7) gaps (e.g., one gap is configured between two consecutive SSBs) in an SSB burst set, a compact SSB pattern may be configured to transmit eight SSBs with less than seven gaps. For example, the compact SSB pattern may have two (2) gaps or four (4) gaps, where some of the SSBs may be transmitted consecutively without a gap. In another example, a compact SSB pattern may include both more SSBs in an SSB burst set and less gaps between SSBs compared to a default/regular SSB pattern. In other words, a compact (or a more compact/denser) SSB pattern may be configured with a higher number of SSBs and/or a lower number of gaps between SSBs in an SSB burst set compared to a default or non-compact SSB pattern.

In one example, a transmitting entity may be configured (e.g., based on a pre-configuration) with one or more modified SSB burst patterns (e.g., different SSB patterns) which may be associated with one or more ES modes. If the transmitting entity is configured with multiple SSB burst patterns, the transmitting entity may transmit an indication to a receiving entity (e.g., a UE, an MT, etc.) indicating the SSB burst pattern used by the transmitting entity, and/or the receiving entity may be configured to detect (e.g., based on blind detection) the SSB burst pattern used by the transmitting entity. For example, the transmitting entity may indicate the SSB burst pattern to receiving entity (e.g., a UE, a MT, etc.) over a Uu interface, such as in a MIB, a SIB, and/or a dedicated RRC message. For BH, the indication for the SSB burst pattern may be transmitted from a CU to a DU, or from a DU to a CU via an F1 interface, or between CUs via an Xn interface.

Figure 14:
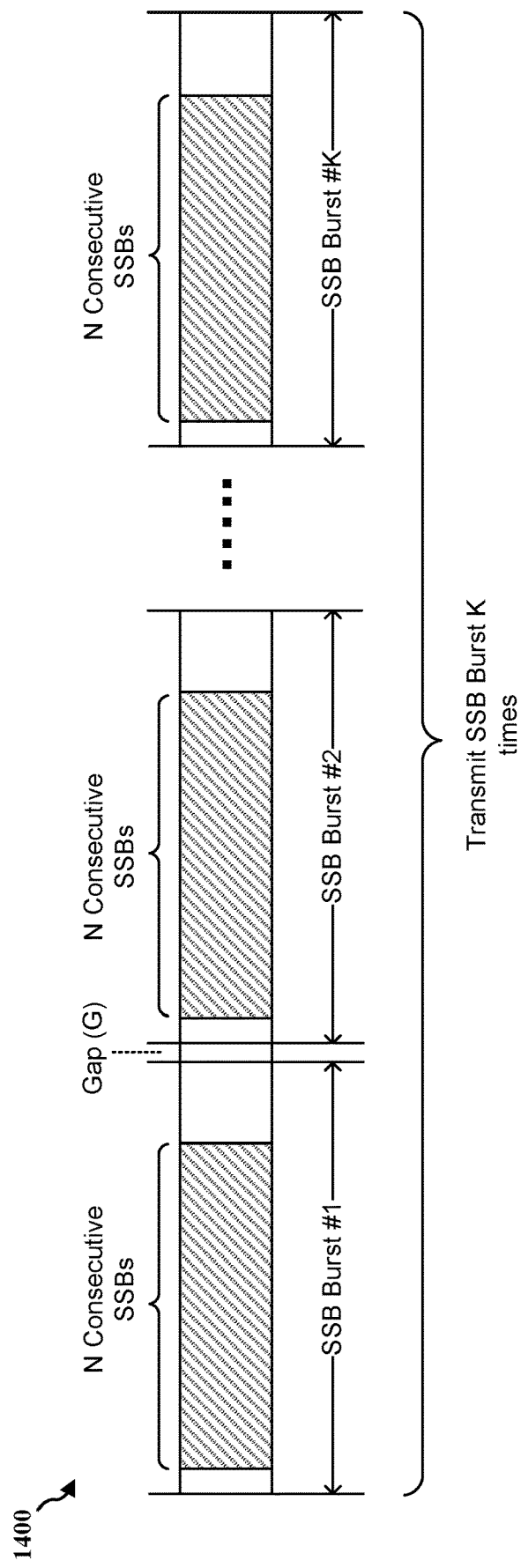
FIG. 14 is a diagram illustrating an example of an SSB burst pattern in accordance with various aspects of the present disclosure.

In another example, one or more SSB burst patterns may be configured and/or indicated by the network. For example, a transmitting entity may be configured to create an SSB burst pattern based on a defined (e.g., a fixed) offset value (e.g., the location of the first SSB) and an interval value (e.g., to indicate the gap between subsequent SSBs). For example, as shown by a diagram 1400 in FIG. 14, a transmitting entity may be configured to transmit N consecutive SSBs (e.g., 8 SSBs, 12 SSBs, etc.) in an SSB burst for K times, with a gap G between SSB bursts.

In another aspect of the present disclosure, a transmitting entity may be configured to transmit SSB with repetitions within a period. In some examples, transmitting SSB with repetitions may provide a faster (e.g., one-shot) detection and beam acquisition for a receiving entity (e.g., a UE, a MT, etc.). For example, for a cell in an ES mode, which may have a long period, transmitting SSB with repetitions may provide more opportunity for RX beam search and/or RX combining at a receiving entity. In addition, for long periods of ES mode, as beam coherence across periods may be lost, a receiving entity may perform additional (e.g., one-shot) cell acquisition. For example, as the channel condition may not change significant within a short period, a receiving entity may assume SSBs transmitted from a cell within a short period are likely to share a same/similar channel condition. However, under an ES mode, as the duration/periodicity of SSBs transmitted from a cell may be much longer (e.g., 0.5 second, 1 second, etc.), the channel condition between transmissions of different SSBs is more likely to change. Thus, a receiving entity, such as a UE in a connected mode, may be configured to re-perform cell acquisition for each SSB burst. In addition, the SSB repetitions may enable a cell in a compensating mode to extend its coverage and provide better link budget (e.g., a link budget may refer to an accounting of all of the gains and losses from the transmitter, through the medium (free space, cable, waveguide, fiber, etc.) to the receiver). For example, if a cell in a compensating mode is transmitting SSBs with repetitions, a UE is more likely to receive the SSBs successfully. Thus, the coverage of the cell may be extended.

Figures 15A, 15B:
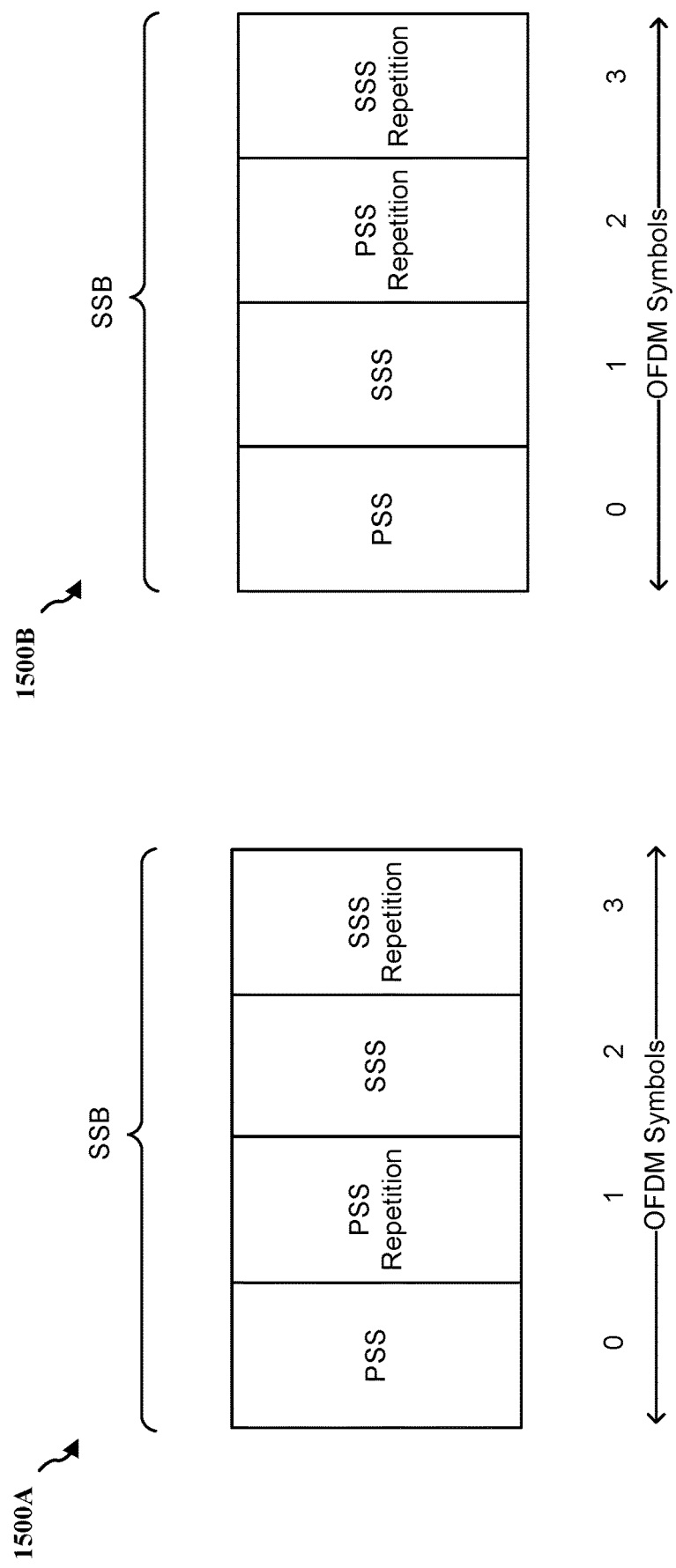
FIGS. 15A and 15B are diagrams illustrating examples of a cell in an ES mode or a compensating mode transmitting SSBs with repetition(s) in accordance with various aspects of the present disclosure.

FIGS. 15A and 15B are diagrams 1500A and 1500B illustrating examples of a cell in an ES mode or a compensating mode transmitting SSBs with repetition(s) in accordance with various aspects of the present disclosure. In one example, PSS and SSS symbols may be repeated within an SSB. For example, as shown by the diagram 1500A, a transmitting entity may transmit each PSS and SSS follow by a repetition, e.g., a PSS is transmitted in a first symbol, a repetition of the PSS is transmitted in a second symbol, an SSS is transmitted in a third symbol, and a repetition of the SSS is transmitted in a fourth symbol, etc. (e.g., PSS-PSS-SSS-SSS). Such configuration may provide an increased link budget, such as for cells in a compensating mode (e.g., as PSS/SSS is transmitted with its repetition consecutively, a receiving entity is more likely to received it). In another example, as shown by the diagram 1500B, a transmitting entity may transmit PSS and SSS in consecutive symbols, and follow by PSS and SSS repetitions. For example, a PSS is transmitted in a first symbol, an SSS is transmitted in a second symbol, a repetition of the PSS is transmitted in a third symbol, and a repetition of the SSS is transmitted in a fourth symbol, etc. (e.g., PSS-SSS-PSS-SSS). Such configuration may be beneficial for a UE performing RX beam change as the UE may be configured to receive SSBs in each burst based on a different Rx beam (which may be good for cells in an ES mode).

In another example, a transmitting entity may be configured to transmit two or more SSBs within a burst in the same direction ("repeated"), where the repeated SSBs may be sent on consecutive symbols. Under such configuration, the transmitting entity (e.g., a base station) may indicate to or configure a receiving entity (e.g., a UE) to assume phase continuity is to be applied across repeated/consecutive (e.g., back-to-back) SSBs.

In another aspect of the present disclosure, one or more dedicated synchronization rasters may be configured for cells in an ES and/or a compensating mode. A synchronization raster may indicate frequency position(s) of a synchronization block that may be used by a UE for system acquisition when explicit signaling of the synchronization block position is not present. The synchronization raster and the subcarrier spacing of the synchronization block may depend on separately for each band. In one example, while cells in an ES mode or a compensating mode may transmit SSBs with modified configurations (e.g., SSBs with a modified PBCH or without a PBCH, SSBs with different burst pattern, etc.), some receiving entities (e.g., older generations of UEs) may not be able to detect these SSBs. As such, to reduce the impact on receiving entities that may not be able to detect SSBs with modified configurations, a transmitting entity may transmit SSBs with modified configurations on new and/or dedicated synchronization raster locations where these receiving entities (e.g., older generations of UEs) do not typically search.

In other words, for a cell in an ES mode or a compensating mode, the cell may send its SSBs on dedicated synchronization raster locations. For example, some synchronization rasters may be associated with and/or dedicated to cells in an ES mode, and some synchronization rasters (e.g., different from synchronization rasters dedicated to cells in the ES mode) may be associated with and/or dedicated to cells in a compensating mode, etc. In some example, a relation and/or mapping may be defined/configured between synchronization rasters of the first group (e.g., cells in an ES mode) and the second group (e.g., cells in a compensating mode). For example, if a UE detects a cell in an ES mode on synchronization raster X, the UE may determine or know which synchronization raster Y to search for a cell in a compensating mode based on the defined/configured relation and/or the mapping. A transmitting entity may indicate the relation and/or the mapping between synchronization rasters for different groups of cells (e.g., cells in an ES mode or a compensating mode) to a receiving entity (e.g., via signaling), and/or the relation and/or the mapping may be pre-configured at the receiving entity.

Figure 16:
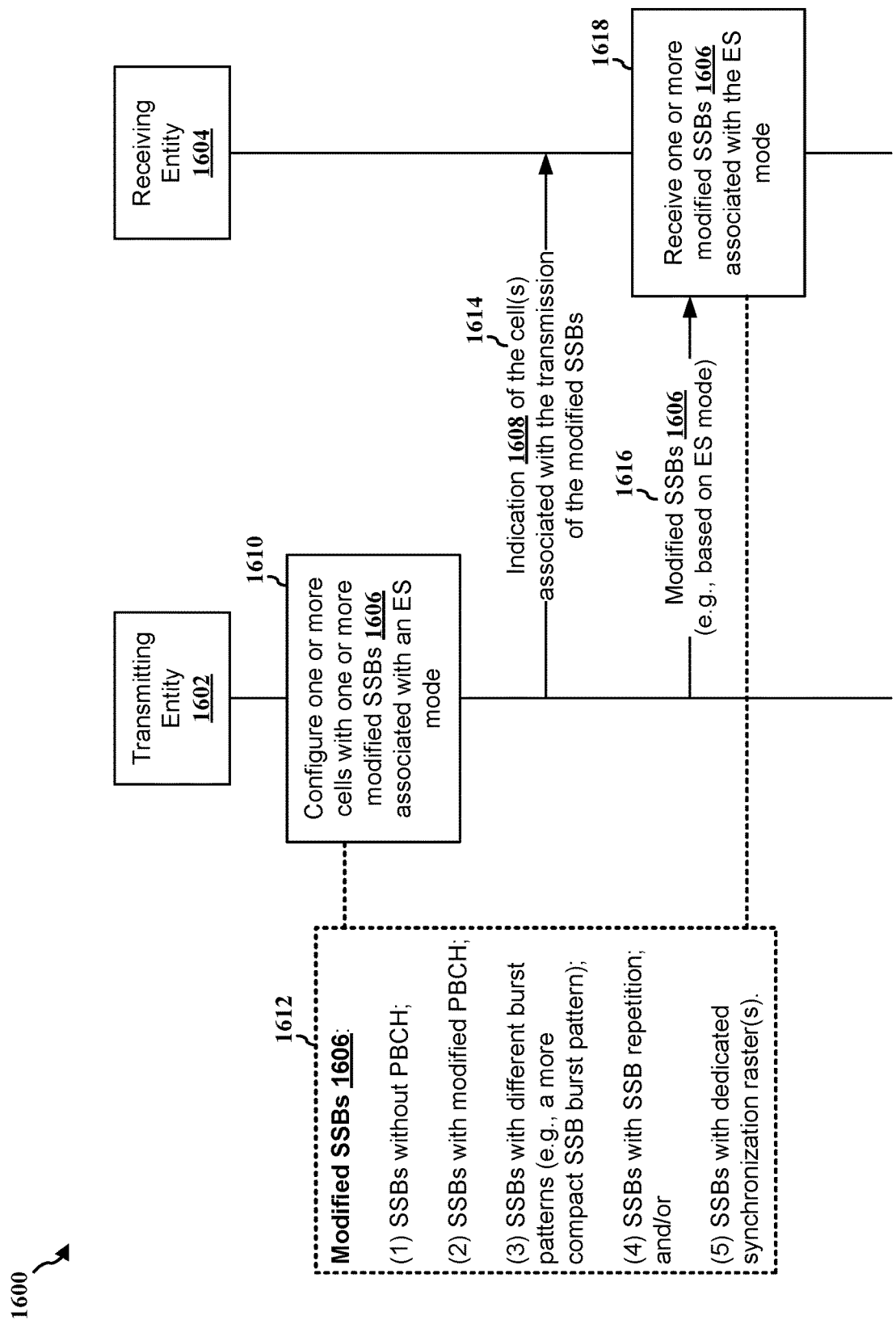
FIG. 16 is a communication flow illustrating an example of a transmitting entity configuring or indicating to a receiving entity for receiving modified SSBs from one or more cells in accordance with various aspects of the present disclosure.

FIG. 16 is a communication flow 1600 illustrating an example of a transmitting entity configuring or indicating to a receiving entity for receiving modified SSBs from one or more cells in accordance with various aspects of the present disclosure. The transmitting entity may include a base station, a CU, and/or a DU, the one or more cells may include a base station, a cell, a TRP, a CU, and/or a DU, and the receiving entity may include a UE, an MT, a CU, and/or a DU. The numberings associated with the communication flow do not specify a particular temporal order and are merely used as references for the communication flow.

At 1610, a transmitting entity 1602 may configure one or more cells of a plurality of cells (which may include the transmitting entity 1602 itself) with one or more modified SSBs 1606 associated with an ES mode.

In one example, as shown at 1612, the modified SSBs 1606 may be SSBs without a PBCH (e.g., as described in connection with FIGS. 11 and 12), SSBs with a modified PBCH (e.g., as described in connection with FIG. 13), SSBs with different burst patterns (e.g., as described in connection with FIG. 14), SSBs with SSB repetition (e.g., as described in connection with FIGS. 15A and 15B), SSBs with dedicated synchronization raster(s), and/or a combination thereof.

At 1614, the transmitting entity 1602 may transmit an indication 1608 of the one or more cells associated with a transmission of the one or more modified SSBs 1606, the transmission of the one or more modified SSBs may correspond to an ES mode at the one or more cells. The one or more cells may be associated with the base station (and include the base station) or at least one other base station.

In one example, the transmitting entity 1602 may transmit (e.g., broadcast) the indication 1608 to a receiving entity 1604 via an SMTC or a SIB. The SMTC may include information indicating whether one or more cells of the plurality of cells transmit SSBs including a PBCH or not in a configured SMTC window, etc. For example, the SMTC may include a list of PCIs of cells that do not transmit SSBs including the PBCH.

At 1616, the transmitting entity may transmit one or more modified SSBs 1606 based on an ES mode.

At 1618, after the receiving entity 1604 receives the indication 1608 (e.g., indication indicating cell(s) associated with modified SSBs), the receiving entity 1604 may receive one or more modified SSBs associated with the ES mode from the transmitting entity 1602 and/or other transmitting entities (e.g., cells, TRPs, base stations, CUs, DUs, etc.).

Figure 17:
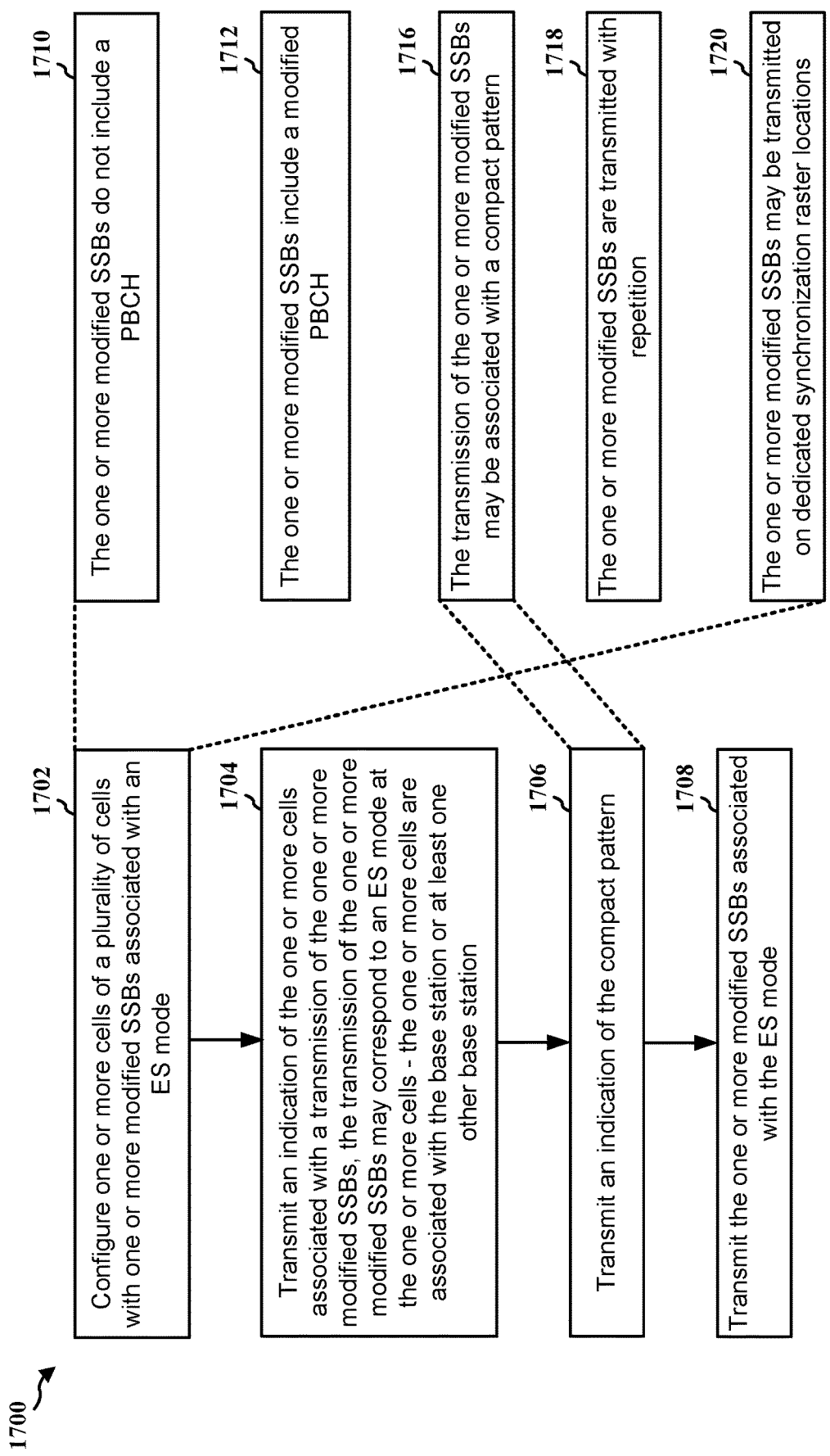
FIG. 17 is a flowchart of a method of wireless communication in accordance with aspects presented herein.

FIG. 17 is a flowchart 1700 of a method of wireless communication. The method may be performed by a base station or a component of a base station (e.g., the base station 102, 180, 310; the transmitting entity 1602; the apparatus 1902; a processing system, which may include the memory 376 and which may be the entire base station 310 or a component of the base station 310, such as the TX processor 316 the RX processor 370, and/or the controller/processor 375). The method may enable the base station to indicate to one or more receiving entities that SSBs of one or more cells (which may include the base station) are to be transmitted with modified configurations. The method may also enable the base station to transmit modified SSBs to enable network energy saving.

At 1702, the base station may configure one or more cells of a plurality of cells with one or more modified SSBs associated with an ES mode, such as described in connection with FIGS. 11 to 16. For example, at 1610, the transmitting entity 1602 (which may be a base station) may configure one or more cells with one or more modified SSBs 1606 associated with an ES mode. The configuration of the one or more modified SSBs may be performed by, e.g., the SSB configuration component 1940 and/or the transmission component 1934 of the apparatus 1902 in FIG. 19.

At 1704, the base station may transmit an indication of the one or more cells associated with a transmission of the one or more modified SSBs, where the transmission of the one or more modified SSBs may correspond to an ES mode at the one or more cells, and the one or more cells may be associated with the base station or at least one other base station, such as described in connection with FIG. 16. For example, at 1614, the transmitting entity 1602 may transmit an indication 1608 of the cell(s) associated with the transmission of the modified SSBs to a receiving entity 1604. The transmission of the indication may be performed by, e.g., the modified SSB indication component 1942 and/or the transmission component 1934 of the apparatus 1902 in FIG. 19.

In one example, the indication may be transmitted from a CU to a DU, transmitted from a DU to a CU, or transmitted between CUs. In such an example, the CU and/or the DU may be associated with an IAB network, or associated with one or more base stations. In another example, the indication may be transmitted to a UE.

In another example, as shown at 1710, the one or more modified SSBs may not include a PBCH. In such an example, the indication may be transmitted to one or more UEs via an SMTC or a SIB. In such an example, the SMTC may include information indicating whether one or more cells of the plurality of cells transmit SSBs including a PBCH or not in a configured SMTC window. In such an example, the SMTC may include a list of PCIs of cells that do not transmit SSBs including the PBCH. In such an example, at least one of PSSs or SSSs in the one or more modified SSBs may be in consecutive symbols In another example, as shown at 1712, the one or more modified SSBs may include a modified PBCH. In such an example, the modified PBCH may include at least one of an SSB index, timing information associated with SFN, information associated with resources and configuration of the one or more modified SSBs, information associated with the ES mode, information associated with RMSI, or information associated with one or more cells that are not in the ES mode or in a compensating mode. In such an example, the modified PBCH may span one symbol in the one or more modified SSBs.

In another example, as shown at 1716, the transmission of the one or more modified SSBs may be associated with a compact SSB pattern that is configured with a higher number of SSBs and/or a lower number of gaps between SSBs in an SSB burst set compared to a default SSB pattern. In such an example, the compact SSB pattern is preconfigured or predefined. In such an example, as shown at 1706, the base station may transmit an indication of the compact SSB pattern, such as described in connection with FIG. 14. The transmission of the compact SSB pattern may be performed by, e.g., the SSB pattern indication component 1944 and/or the transmission component 1934 of the apparatus 1902 in FIG. 19.

In another example, as shown at 1718, the one or more modified SSBs may be transmitted with repetition. In such an example, symbols for at least one of PSSs or SSSs may be repeated within an SSB.

In another example, as shown at 1720, the one or more modified SSBs may be transmitted on dedicated synchronization raster locations.

At 1708, the base station may transmit the one or more modified SSBs associated with the ES mode, such as described in connection with FIG. 16. For example, at 1616, the transmitting entity 1602 may transmit modified SSBs 1606 to the receiving entity 1604 based on an ES mode. The transmission of the modified SSBs be performed by, e.g., the modified SSB process component 1946 and/or the transmission component 1934 of the apparatus 1902 in FIG. 19.

Figure 18:
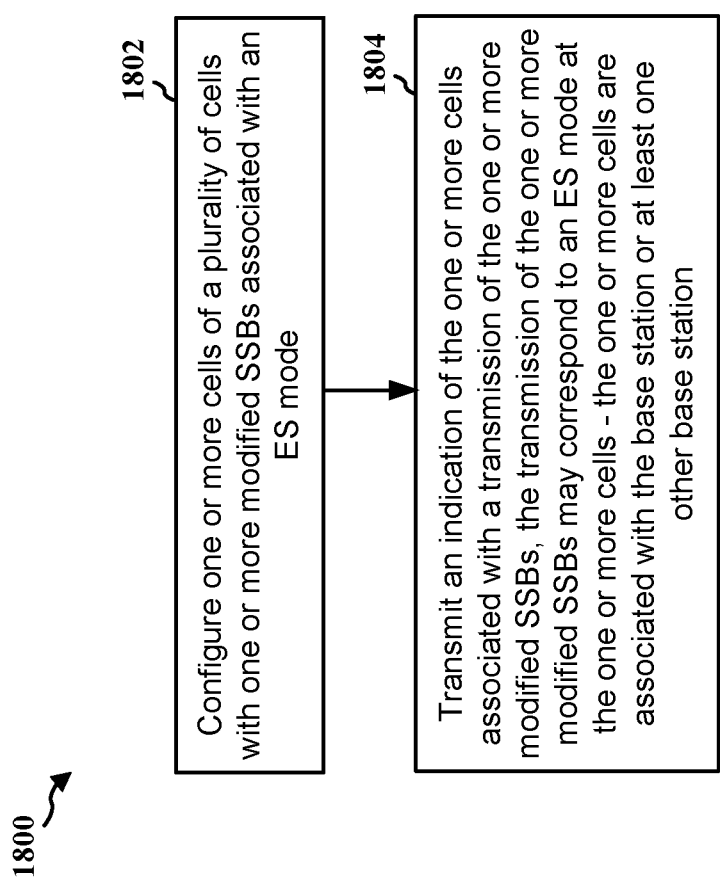
FIG. 18 is a flowchart of a method of wireless communication in accordance with aspects presented herein.

FIG. 18 is a flowchart 1800 of a method of wireless communication. The method may be performed by a base station or a component of a base station (e.g., the base station 102, 180, 310; the transmitting entity 1602; the apparatus 1902; a processing system, which may include the memory 376 and which may be the entire base station 310 or a component of the base station 310, such as the TX processor 316 the RX processor 370, and/or the controller/processor 375). The method may enable the base station to indicate to one or more receiving entities that SSBs of one or more cells (which may include the base station) are to be transmitted with modified configurations. The method may also enable the base station to transmit modified SSBs to enable network energy saving.

At 1802, the base station may configure one or more cells of a plurality of cells with one or more modified SSBs associated with an ES mode, such as described in connection with FIGS. 11 to 16. For example, at 1610, the transmitting entity 1602 (which may be a base station) may configure one or more cells with one or more modified SSBs 1606 associated with an ES mode. The configuration of the one or more modified SSBs may be performed by, e.g., the SSB configuration component 1940 and/or the transmission component 1934 of the apparatus 1902 in FIG. 19.

At 1804, the base station may transmit an indication of the one or more cells associated with a transmission of the one or more modified SSBs, where the transmission of the one or more modified SSBs may correspond to an ES mode at the one or more cells, and the one or more cells may be associated with the base station or at least one other base station, such as described in connection with FIG. 16. For example, at 1614, the transmitting entity 1602 may transmit an indication 1608 of the cell(s) associated with the transmission of the modified SSBs to a receiving entity 1604. The transmission of the indication may be performed by, e.g., the modified SSB indication component 1942 and/or the transmission component 1934 of the apparatus 1902 in FIG. 19.

In one example, the indication may be transmitted from a CU to a DU, transmitted from a DU to a CU, or transmitted between CUs. In such an example, the CU and/or the DU may be associated with an IAB network, or associated with one or more base stations. In another example, the indication may be transmitted to a UE.

In another example, the one or more modified SSBs may not include a PBCH. In such an example, the indication may be transmitted to one or more UEs via an SMTC or a SIB. In such an example, the SMTC may include information indicating whether one or more cells of the plurality of cells transmit SSBs including a PBCH or not in a configured SMTC window. In such an example, the SMTC may include a list of PCIs of cells that do not transmit SSBs including the PBCH. In such an example, at least one of PSSs or SSSs in the one or more modified SSBs may be in consecutive symbols In another example, the one or more modified SSBs may include a modified PBCH. In such an example, the modified PBCH may include at least one of an SSB index, timing information associated with SFN, information associated with resources and configuration of the one or more modified SSBs, information associated with the ES mode, information associated with RMSI, or information associated with one or more cells that are not in the ES mode or in a compensating mode. In such an example, the modified PBCH may span one symbol in the one or more modified SSBs.

In another example, the transmission of the one or more modified SSBs may be associated with a compact (or a more compact/denser) SSB pattern that is configured with a higher number of SSBs and/or a lower number of gaps between SSBs in an SSB burst set compared to a default SSB pattern. In such an example, the compact SSB pattern is preconfigured or predefined. In such an example, the base station may transmit an indication of the compact SSB pattern, such as described in connection with FIG. 14. The transmission of the compact SSB pattern may be performed by, e.g., the SSB pattern indication component 1944 and/or the transmission component 1934 of the apparatus 1902 in FIG. 19.

In another example, the one or more modified SSBs may be transmitted with repetition. In such an example, symbols for at least one of PSSs or SSSs may be repeated within an SSB.

In another example, the one or more modified SSBs may be transmitted on dedicated synchronization raster locations.

In another example, the base station may transmit the one or more modified SSBs associated with the ES mode, such as described in connection with FIG. 16. For example, at 1616, the transmitting entity 1602 may transmit modified SSBs 1606 to the receiving entity 1604 based on an ES mode. The transmission of the modified SSBs be performed by, e.g., the modified SSB process component 1946 and/or the transmission component 1934 of the apparatus 1902 in FIG. 19.

Figure 19:
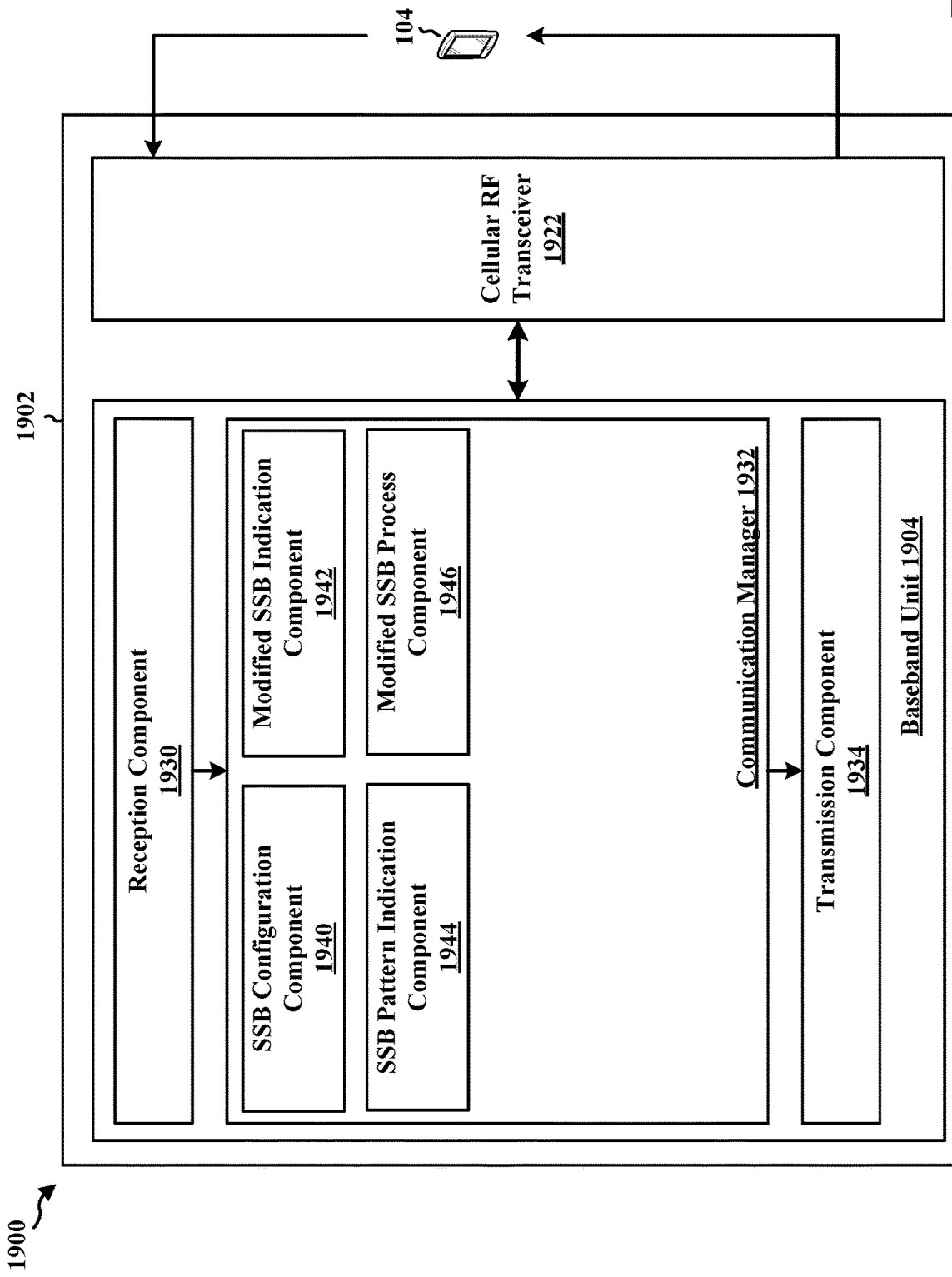
FIG. 19 is a diagram illustrating an example of a hardware implementation for an example apparatus in accordance with aspects presented herein.

FIG. 19 is a diagram 1900 illustrating an example of a hardware implementation for an apparatus 1902. The apparatus 1902 may be a base station, a component of a base station, or may implement base station functionality. In some aspects, the apparatus 1902 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes an SSB configuration component 1940 that configures one or more cells of a plurality of cells with one or more modified SSBs associated with an ES mode, e.g., as described in connection with 1702 of FIG. 17 and/or 1802 of FIG. 18. The communication manager 1932 further includes a modified SSB indication component 1942 that transmits an indication of the one or more cells associated with a transmission of the one or more modified SSBs, the transmission of the one or more modified SSBs may correspond to an ES mode at the one or more cells, and the one or more cells may be associated with the base station or at least one other base station, e.g., as described in connection with 1704 of FIG. 17 and/or 1804 of FIG. 18. The communication manager 1932 further includes an SSB pattern indication component 1944 that transmits an indication of the compact SSB pattern, e.g., as described in connection with 1706 of FIG. 17. The communication manager 1932 further includes a modified SSB process component 1946 that transmits the one or more modified SSBs associated with the ES mode, e.g., as described in connection with 1708 of FIG. 17.

The apparatus may include additional components that perform each of the blocks of the algorithm in the flowcharts of FIGS. 17 and 18. As such, each block in the flowcharts of FIGS. 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof As shown, the apparatus 1902 may include a variety of components configured for various functions. In one configuration, the apparatus 1902, and in particular the baseband unit 1904, includes means for configuring one or more cells of a plurality of cells with one or more modified SSBs associated with an ES mode (e.g., the SSB configuration component 1940 and/or the transmission component 1934). The apparatus 1702 includes means for transmitting an indication of the one or more cells associated with a transmission of the one or more modified SSBs, the transmission of the one or more modified SSBs corresponding to an ES mode at the one or more cells, the one or more cells being associated with the base station or at least one other base station (e.g., the modified SSB indication component 1942 and/or the transmission component 1934). The apparatus 1702 includes means for transmitting an indication of the compact SSB pattern (e.g., the SSB pattern indication component 1944 and/or the transmission component 1934). The apparatus 1702 includes means for transmitting the one or more modified SSBs associated with the ES mode (e.g., the modified SSB process component 1946 and/or the transmission component 1934).

In one configuration, the indication may be transmitted from a CU to a DU, transmitted from a DU to a CU, or transmitted between CUs. In another configuration, the indication may be transmitted to a UE.

In another configuration, the one or more modified SSBs may not include a PBCH. In such a configuration, the indication may be transmitted to one or more UEs via an SMTC or a SIB. In such a configuration, the SMTC may include information indicating whether one or more cells of the plurality of cells transmit SSBs including a PBCH or not in a configured SMTC window. In such a configuration, the SMTC may include a list of PCIs of cells that do not transmit SSBs including the PBCH. In such a configuration, at least one of PSSs or SSSs in the one or more modified SSBs may be in consecutive symbols In another configuration, the one or more modified SSBs may include a modified PBCH. In such a configuration, the modified PBCH may include at least one of an SSB index, timing information associated with SFN, information associated with resources and configuration of the one or more modified SSBs, information associated with the ES mode, information associated with RMSI, or information associated with one or more cells that are not in the ES mode or in a compensating mode. In such a configuration, the modified PBCH may span one symbol in the one or more modified SSBs.

In another configuration, the transmission of the one or more modified SSBs may be associated with a compact SSB pattern that is configured with a higher number of SSBs and/or a lower number of gaps between SSBs in an SSB burst set compared to a default SSB pattern. In such a configuration, the compact SSB pattern is preconfigured or predefined.

In another configuration, the one or more modified SSBs may be transmitted with repetition. In such a configuration, symbols for at least one of PSSs or SSSs may be repeated within an SSB.

In another configuration, the one or more modified SSBs may be transmitted on dedicated synchronization raster locations.

The means may be one or more of the components of the apparatus 1902 configured to perform the functions recited by the means. As described supra, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 20:
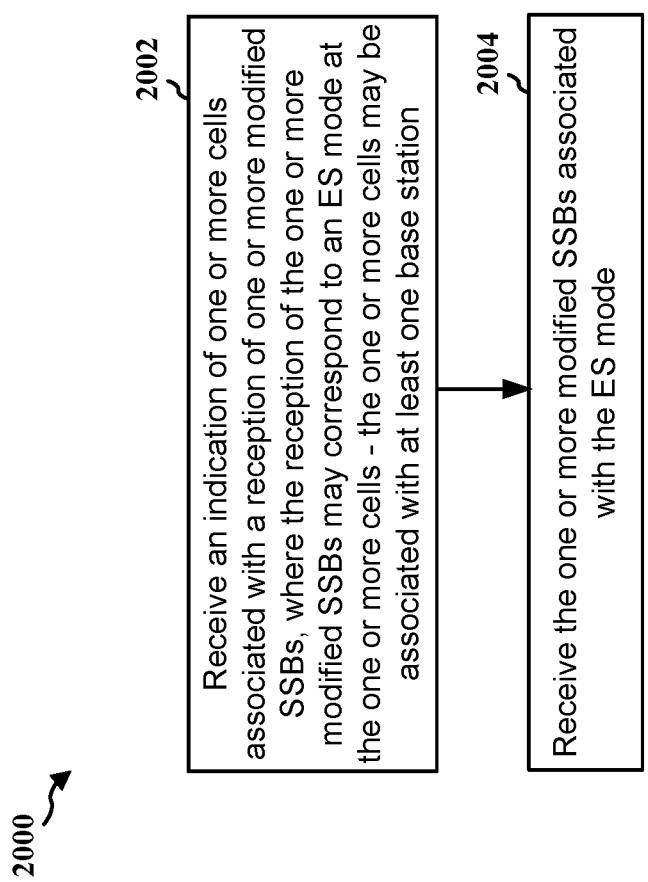
FIG. 20 is a flowchart of a method of wireless communication in accordance with aspects presented herein.

FIG. 20 is a flowchart 2000 of a method of wireless communication. The method may be performed by a UE or a component of a UE (e.g., the UE 104, 350; the receiving entity 1604; the apparatus 2102; a processing system, which may include the memory 360 and which may be the entire UE 350 or a component of the UE 350, such as the TX processor 368, the RX processor 356, and/or the controller/processor 359). The method may enable a UE to receive SSBs with modified configurations from one or more cells.

At 2002, the UE may receive an indication of one or more cells associated with a reception of one or more modified SSBs, the reception of the one or more modified SSBs may correspond to an ES mode at the one or more cells, and the one or more cells may be associated with at least one base station, such as described in connection with FIGS. 11 to 16. For example, at 1614, the receiving entity 1604 may receive an indication 1608, where the indication may indicate cell(s) associated with the transmission of the modified SSBs. The reception of the indication may be performed by, e.g., the modified SSB process component 2142 and/or the reception component 2130 of the apparatus 2102 in FIG. 21.

At 2004, the UE may receive the one or more modified SSBs associated with the ES mode, such as described in connection with FIG. 16. For example, at 1618, the receiving entity 1604 may receive one or more modified SSBs 1606 associated with the ES mode, such as from the transmitting entity 1602. The reception of the modified SSBs may be performed by, e.g., the modified SSB process component 2142 and/or the reception component 2130 of the apparatus 2102 in FIG. 21.

In one example, the indication may be received from a base station, a DU, or a CU. In such an example, the CU and/or the DU may be associated with an IAB network, or associated with one or more base stations.

In another example, the one or more modified SSBs may not include a PBCH. In such an example, the indication may be received via an SMTC or a SIB. In such an example, the SMTC may include information indicating whether one or more cells transmit SSBs including a PBCH or not in a configured SMTC window. In such an example, the SMTC may include a list of PCIs of cells that do not transmit SSBs including the PBCH. In such an example, at least one of PSSs or SSSs in the one or more modified SSBs may be in consecutive symbols.

In another example, the one or more modified SSBs may include a modified PBCH. In such an example, the modified PBCH may include at least one of an SSB index, timing information associated with SFN, information associated with resources and configuration of the one or more modified SSBs, information associated with the ES mode, information associated with RMSI, or information associated with one or more cells that are not in the ES mode or in a compensating mode. In such an example, the modified PBCH may span one symbol in the one or more modified SSBs.

In another example, the reception of the one or more modified SSBs may be associated with a compact SSB pattern that is configured with a higher number of SSBs and/or a lower number of gaps between SSBs in an SSB burst set compared to a default SSB pattern. In such an example, the compact SSB pattern may be preconfigured or predefined. In such an example, the UE may receive an indication of the compact SSB pattern.

In another example, the one or more modified SSBs may be received with repetition. In such an example, symbols for at least one of PSSs or SSSs are repeated within an SSB.

In another example, the one or more modified SSBs are received on dedicated synchronization raster locations.

Figure 21:
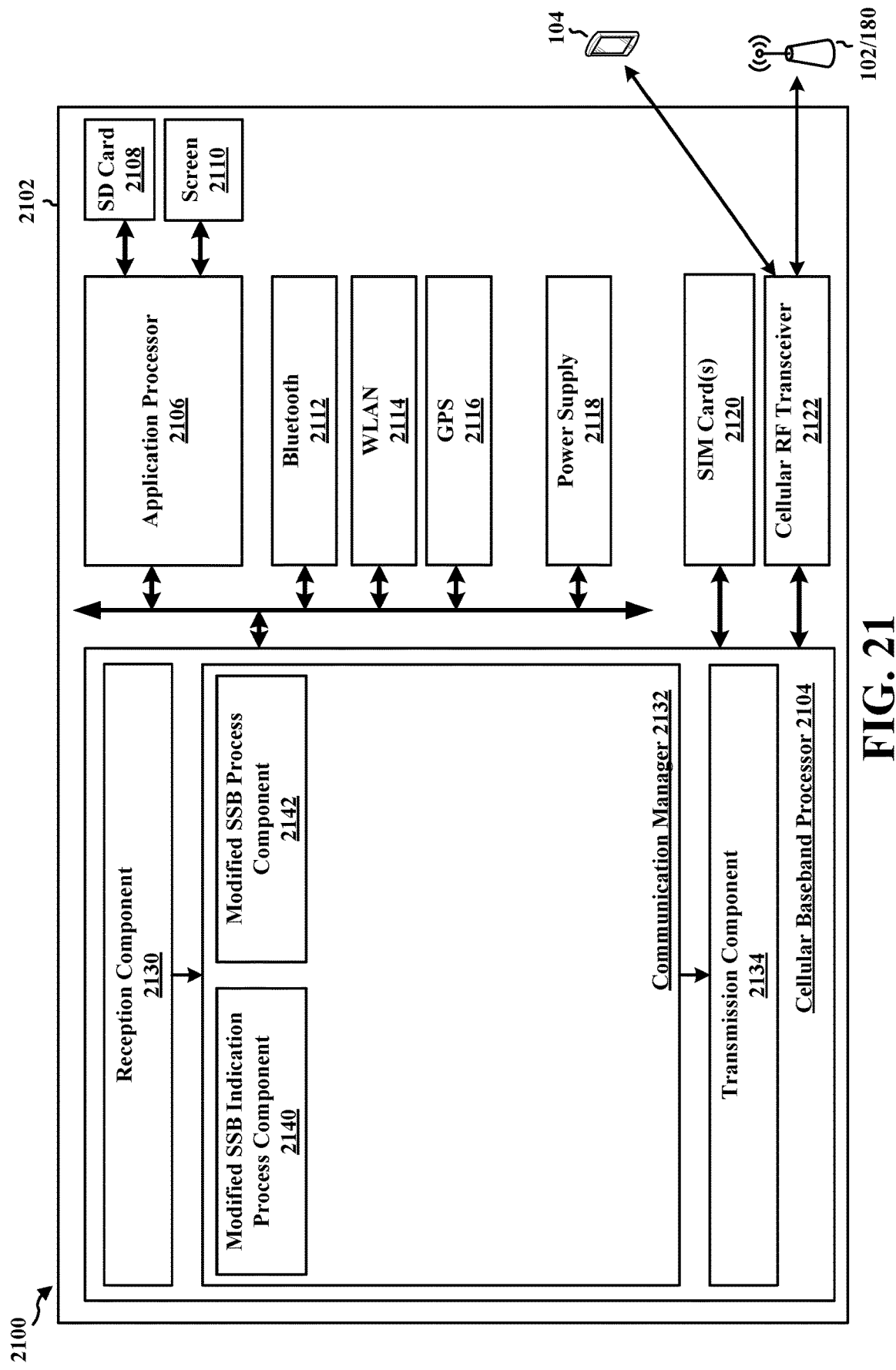
FIG. 21 is a diagram illustrating an example of a hardware implementation for an example apparatus in accordance with aspects presented herein.

FIG. 21 is a diagram 2100 illustrating an example of a hardware implementation for an apparatus 2102. The apparatus 2102 may be a UE, a component of a UE, or may implement UE functionality. In some aspects, the apparatus 2102 may include a cellular baseband processor 2104 (also referred to as a modem) coupled to a cellular RF transceiver 2122. In some aspects, the apparatus 2102 may further include one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, or a power supply 2118. The cellular baseband processor 2104 communicates through the cellular RF transceiver 2122 with the UE 104 and/or BS 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the UE 350 and may include the memory 360 and/or at least one of the TX processor 368, the RX processor 356, and the controller/processor 359. In one configuration, the apparatus 2102 may be a modem chip and include just the baseband processor 2104, and in another configuration, the apparatus 2102 may be the entire UE (e.g., see 350 of FIG. 3) and include the additional modules of the apparatus 2102.

The communication manager 2132 includes a modified SSB indication process component 2140 that is configured to receive an indication of one or more cells associated with a reception of one or more modified SSBs, the reception of the one or more modified SSBs corresponding to an ES mode at the one or more cells, the one or more cells being associated with at least one base station, e.g., as described in connection with 2002 of FIG. 20. The communication manager 2132 further includes a modified SSB process component 2142 that is configured to receive the one or more modified SSBs associated with the ES mode, e.g., as described in connection with 2004 of FIG. 20.

The apparatus may include additional components that perform each of the blocks of the algorithm in the flowchart of FIG. 20. As such, each block in the flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2102 may include a variety of components configured for various functions. In one configuration, the apparatus 2102, and in particular the cellular baseband processor 2104, includes means for receiving an indication of one or more cells associated with a reception of one or more modified SSBs, the reception of the one or more modified SSBs corresponding to an ES mode at the one or more cells, the one or more cells being associated with at least one base station (e.g., the modified SSB indication process component 2140 and/or the reception component 2130). The apparatus 2102 includes means for receiving, from the base station, an indication of an activation of the plurality of TR locations associated with at least one of the DL channel or the UL channel (e.g., the TR activation process component 2142 and/or the reception component 2130). The apparatus 2102 includes means for receiving the one or more modified SSBs associated with the ES mode (e.g., the modified SSB process component 2142 and/or the reception component 2130).

In one configuration, the indication may be received from a base station, a DU, or a CU.

In another configuration, the one or more modified SSBs may not include a PBCH. In such a configuration, the indication may be received via an SMTC or a SIB. In such a configuration, the SMTC may include information indicating whether one or more cells transmit SSBs including a PBCH or not in a configured SMTC window. In such a configuration, the SMTC may include a list of PCIs of cells that do not transmit SSBs including the PBCH. In such a configuration, at least one of PSSs or SSSs in the one or more modified SSBs may be in consecutive symbols.

In another configuration, the one or more modified SSBs may include a modified PBCH. In such a configuration, the modified PBCH may include at least one of an SSB index, timing information associated with SFN, information associated with resources and configuration of the one or more modified SSBs, information associated with the ES mode, information associated with RMSI, or information associated with one or more cells that are not in the ES mode or in a compensating mode. In such a configuration, the modified PBCH may span one symbol in the one or more modified SSBs.

In another configuration, the reception of the one or more modified SSBs may be associated with a compact SSB pattern that is configured with a higher number of SSBs and/or a lower number of gaps between SSBs in an SSB burst set compared to a default SSB pattern. In such a configuration, the compact SSB pattern may be preconfigured or predefined. In such a configuration, the UE may receive an indication of the SSB compact pattern.

In another configuration, the one or more modified SSBs may be received with repetition. In such a configuration, symbols for at least one of PSSs or SSSs are repeated within an SSB.

In another configuration, the one or more modified SSBs are received on dedicated synchronization raster locations.

The means may be one or more of the components of the apparatus 2102 configured to perform the functions recited by the means. As described supra, the apparatus 2102 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to configure one or more cells of a plurality of cells with one or more modified SSBs associated with an ES mode; and transmit an indication of the one or more cells associated with a transmission of the one or more modified SSBs, the transmission of the one or more modified SSBs corresponding to an ES mode at the one or more cells, the one or more cells being associated with the base station or at least one other base station.

Aspect 2 is the apparatus of aspect 1, further including a transceiver coupled to the at least one processor.

Aspect 3 is the apparatus of any of aspects 1 and 2, where the indication is transmitted from a CU to a DU, transmitted from a DU to a CU, or transmitted between CUs associated with the base station.

Aspect 4 is the apparatus of any of aspects 1 to 3, where the indication is transmitted to a UE.

Aspect 5 is the apparatus of any of aspects 1 to 4, where the one or more modified SSBs do not include a PBCH.

Aspect 6 is the apparatus of any of aspects 1 to 5, where the indication is transmitted to one or more UEs via an SMTC or a SIB.

Aspect 7 is the apparatus of any of aspects 1 to 6, where the SMTC includes information indicating whether one or more cells of the plurality of cells transmit SSBs including a PBCH or not in a configured SMTC window.

Aspect 8 is the apparatus of any of aspects 1 to 7, where the SMTC includes a list of PCIs of cells that do not transmit SSBs including the PBCH.

Aspect 9 is the apparatus of any of aspects 1 to 8, where at least one of PSSs or SSSs in the one or more modified SSBs are in consecutive symbols.

Aspect 10 is the apparatus of any of aspects 1 to 9, where the one or more modified SSBs include a modified PBCH.

Aspect 11 is the apparatus of any of aspects 1 to 10, where the modified PBCH includes at least one of an SSB index, timing information associated with SFN, information associated with resources and configuration of the one or more modified SSBs, information associated with the ES mode, information associated with RMSI, or information associated with one or more cells that are not in the ES mode or in a compensating mode.

Aspect 12 is the apparatus of any of aspects 1 to 11, where the modified PBCH spans one symbol in the one or more modified SSBs.

Aspect 13 is the apparatus of any of aspects 1 to 12, where the transmission of the one or more modified SSBs are associated with a compact SSB pattern that is configured with at least one of a higher number of SSBs or a lower number of gaps between SSBs in an SSB burst set compared to a default SSB pattern.

Aspect 14 is the apparatus of any of aspects 1 to 13, where the compact SSB pattern is preconfigured or predefined.

Aspect 15 is the apparatus of any of aspects 1 to 14, where the at least one processor is further configured to: transmit an indication of the compact SSB pattern the indication.

Aspect 16 is the apparatus of any of aspects 1 to 15, where the one or more modified SSBs are transmitted with repetition.

Aspect 17 is the apparatus of any of aspects 1 to 16, where symbols for at least one of PSSs or SSSs are repeated within an SSB.

Aspect 18 is the apparatus of any of aspects 1 to 17, where the one or more modified SSBs are transmitted on dedicated synchronization raster locations.

Aspect 19 is the apparatus of any of aspects 1 to 18, where the at least one processor is further configured to: transmit the one or more modified SSBs associated with the ES mode.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

Aspect 23 is an apparatus for wireless communication including at least one processor coupled to a memory and configured to receive an indication of one or more cells associated with a reception of one or more modified SSBs, the reception of the one or more modified SSBs corresponding to an ES mode at the one or more cells, the one or more cells being associated with at least one base station; and receive the one or more modified SSBs associated with the ES mode.

Aspect 24 is the apparatus of aspect 23, further including a transceiver coupled to the at least one processor.

Aspect 25 is the apparatus of any of aspects 23 and 24, where the indication is received from a base station, a DU, or a CU.

Aspect 26 is the apparatus of any of aspects 23 to 25, where the one or more modified SSBs do not include a PBCH.

Aspect 27 is the apparatus of any of aspects 23 to 26, where the indication is received via an SMTC or a SIB.

Aspect 28 is the apparatus of any of aspects 23 to 27, where the SMTC include s information indicating whether one or more cells transmit SSBs including a PBCH or not in a configured SMTC window.

Aspect 29 is the apparatus of any of aspects 23 to 28, where the SMTC includes a list of PCIs of cells that do not transmit SSBs including the PBCH.

Aspect 30 is the apparatus of any of aspects 23 to 29, where at least one of PSSs or SSSs in the one or more modified SSBs are in consecutive symbols.

Aspect 31 is the apparatus of any of aspects 23 to 30, where the one or more modified SSBs include a modified PBCH.

Aspect 32 is the apparatus of any of aspects 23 to 31, where the modified PBCH includes at least one of an SSB index, timing information associated with SFN, information associated with resources and configuration of the one or more modified SSBs, information associated with the ES mode, information associated with RMSI, or information associated with one or more cells that are not in the ES mode or in a compensating mode.

Aspect 33 is the apparatus of any of aspects 23 to 32, where the modified PBCH spans one symbol in the one or more modified SSBs.

Aspect 34 is the apparatus of any of aspects 23 to 33, where the reception of the one or more modified SSBs is associated with a compact pattern.

Aspect 35 is the apparatus of any of aspects 23 to 34, where the compact pattern is preconfigured or predefined.

Aspect 36 is the apparatus of any of aspects 23 to 35, where the at least one processor is further configured to: receive an indication of the compact pattern.

Aspect 37 is the apparatus of any of aspects 23 to 36, where the one or more modified SSBs are received with repetition.

Aspect 38 is the apparatus of any of aspects 23 to 37, where symbols for at least one of PSSs or SSSs are repeated within an SSB.

Aspect 39 is the apparatus of any of aspects 23 to 38, where the one or more modified SSBs are received on dedicated synchronization raster locations.

Aspect 40 is a method of wireless communication for implementing any of aspects 23 to 39.

Aspect 41 is an apparatus for wireless communication including means for implementing any of aspects 23 to 39.

Aspect 42 is a computer-readable medium storing computer executable code, where the code when executed by a processor causes the processor to implement any of aspects 23 to 39.

What is claimed is:

1. An apparatus for wireless communication at a base station, comprising:
a memory; and
at least one processor coupled to the memory and configured to:
configure one or more cells of a plurality of cells with one or more modified synchronization signal blocks (SSBs) associated with an energy saving (ES) mode; and
transmit an indication of the one or more cells associated with a transmission of the one or more modified SSBs, the transmission of the one or more modified SSBs corresponding to an ES mode at the one or more cells, the one or more cells being associated with the base station or at least one other base station.

2. The apparatus of claim 1, wherein the indication is transmitted from a central unit (CU) to a distributed unit (DU), transmitted from a DU to a CU, or transmitted between CUs.

3. The apparatus of claim 1, wherein the indication is transmitted to a user equipment (UE).

4. The apparatus of claim 1, wherein the one or more modified SSBs do not include a physical broadcast channel (PBCH).

5. The apparatus of claim 4, wherein the indication is transmitted to one or more user equipments (UEs) via an SSB-based measurement timing configuration (SMTC) or a system information block (SIB).

6. The apparatus of claim 5, wherein the SMTC includes information indicating whether one or more cells of the plurality of cells transmit SSBs including a PBCH or not in a configured SMTC window.

7. The apparatus of claim 5, wherein the SMTC includes a list of physical cell identifiers (PCIs) of cells that do not transmit SSBs including the PBCH.

8. The apparatus of claim 4, wherein at least one of primary synchronization signals (PSSs) or secondary synchronization signal (SSSs) in the one or more modified SSBs are in consecutive symbols.

9. The apparatus of claim 1, wherein the one or more modified SSBs include a modified physical broadcast channel (PBCH).

10. The apparatus of claim 9, wherein the modified PBCH includes at least one of an SSB index, timing information associated with system frame number (SFN), information associated with resources and configuration of the one or more modified SSBs, information associated with the ES mode, information associated with remaining system information (RMSI), or information associated with one or more cells that are not in the ES mode or in a compensating mode.

11. The apparatus of claim 9, wherein the modified PBCH spans one symbol in the one or more modified SSBs.

12. The apparatus of claim 1, wherein the transmission of the one or more modified SSBs are associated with a compact SSB pattern that is configured with at least one of a higher number of SSBs or a lower number of gaps between SSBs in an SSB burst set compared to a default SSB pattern.

13. The apparatus of claim 12, wherein the compact SSB pattern is preconfigured or predefined.

14. The apparatus of claim 12, wherein the at least one processor is further configured to:
transmit an indication of the compact SSB pattern.

15. The apparatus of claim 1, wherein the one or more modified SSBs are transmitted with repetition.

16. The apparatus of claim 15, wherein symbols for at least one of primary synchronization signals (PSSs) or secondary synchronization signals (SSSs) are repeated within an SSB.

17. The apparatus of claim 1, wherein the one or more modified SSBs are transmitted on dedicated synchronization raster locations.

18. The apparatus of claim 1, wherein the at least one processor is further configured to:
transmit the one or more modified SSBs associated with the ES mode.

19. The apparatus of claim 1, further comprising a transceiver coupled to the at least one processor.

20. A method of wireless communication at a base station, comprising:
configuring one or more cells of a plurality of cells with one or more modified synchronization signal blocks (SSBs) associated with an energy saving (ES) mode; and
transmitting an indication of the one or more cells associated with a transmission of the one or more modified SSBs, the transmission of the one or more modified SSBs corresponding to an ES mode at the one or more cells, the one or more cells being associated with the base station or at least one other base station.

21. An apparatus for wireless communication at a user equipment (UE), comprising:
a memory; and
at least one processor coupled to the memory and configured to:
receive an indication of one or more cells associated with a reception of one or more modified synchronization signal blocks (SSBs), the reception of the one or more modified SSBs corresponding to an energy saving (ES) mode at the one or more cells, the one or more cells being associated with at least one base station; and
receive the one or more modified SSBs associated with the ES mode.

22. The apparatus of claim 21, wherein the indication is received from a base station, a distributed unit (DU), or a central unit (CU).

23. The apparatus of claim 21, wherein the one or more modified SSBs do not include a physical broadcast channel (PBCH).

24. The apparatus of claim 23, wherein the indication is received via an SSB-based measurement timing configuration (SMTC) or a system information block (SIB).

25. The apparatus of claim 21, wherein the one or more modified SSBs include a modified physical broadcast channel (PBCH).

26. The apparatus of claim 21, wherein the reception of the one or more modified SSBs is associated with a compact SSB pattern that is configured with at least one of a higher number of SSBs or a lower number of gaps between SSBs in an SSB burst set compared to a default SSB pattern.

27. The apparatus of claim 21, wherein the one or more modified SSBs are received with repetition.

28. The apparatus of claim 21, wherein the one or more modified SSBs are received on dedicated synchronization raster locations.

29. The apparatus of claim 21, further comprising a transceiver coupled to the at least one processor.

30. A method of wireless communication at a user equipment (UE), comprising:
- receiving an indication of one or more cells associated with a reception of one or more modified synchronization signal blocks (SSBs), the reception of the one or more modified SSBs corresponding to an energy saving (ES) mode at the one or more cells, the one or more cells being associated with at least one base station; and
- receiving the one or more modified SSBs associated with the ES mode.

\* \* \* \* \*